United States Patent
Bendtsen et al.

(10) Patent No.: US 9,618,162 B2
(45) Date of Patent: Apr. 11, 2017

(54) LED LAMP

(71) Applicant: Cree, Inc., Durham, NC (US)

(72) Inventors: Andrew Bendtsen, Racine, WI (US); Kurt Wilcox, Libertyville, IL (US); Curt Progl, Raleigh, NC (US); Brian Kinnune, Racine, WI (US)

(73) Assignee: Cree, Inc., Durham, NC (US)

( * ) Notice: Subject to any disclaimer, the term of this patent is extended or adjusted under 35 U.S.C. 154(b) by 169 days.

(21) Appl. No.: 14/284,781

(22) Filed: May 22, 2014

(65) Prior Publication Data

US 2015/0308630 A1 Oct. 29, 2015

Related U.S. Application Data

(60) Provisional application No. 61/984,467, filed on Apr. 25, 2014.

(51) Int. Cl.
*F21K 9/23* (2016.01)
*F21K 9/232* (2016.01)
(Continued)

(52) U.S. Cl.
CPC .............. *F21K 9/1355* (2013.01); *F21K 9/23* (2016.08); *F21V 3/00* (2013.01); *F21V 7/0066* (2013.01);
(Continued)

(58) Field of Classification Search
CPC .......... F21K 9/1355; F21K 9/23; F21K 9/232; F21K 9/238; F21S 8/088
See application file for complete search history.

(56) References Cited

U.S. PATENT DOCUMENTS 3,581,162 A 5/1971 Wheatley
4,675,797 A 6/1987 Vinciarelli
(Continued)

FOREIGN PATENT DOCUMENTS

EP 1058221 A2 12/2000
EP 0890059 B1 6/2004
(Continued)

OTHER PUBLICATIONS

U.S. Appl. No. 61/984,467, filed Apr. 25, 2014.
(Continued)

*Primary Examiner* — Anh Mai
*Assistant Examiner* — Zachary J Snyder
(74) *Attorney, Agent, or Firm* — Denis J. Williamson; Moore & Van Allen PLLC

(57) ABSTRACT

A LED lamp for use in an existing light fixture having an electrical receptacle comprises an at least partially optically transmissive enclosure and a base having an external size that may be the same size or smaller than an external size of the electrical receptacle. A LED assembly is operable to emit light when energized through an electrical path from the base. The base comprises a universal mounting mechanism for mounting the lamp to the light fixture. A surge protector and an electrical connector are positioned at least partially in the base and are in the electrical path. A heat sink comprises a first portion in the enclosure for supporting the LED assembly and a second portion external of the enclosure for dissipating heat. The base is connected to the heat sink.

34 Claims, 16 Drawing Sheets

(51) Int. Cl.
| | | |
|---|---|---|
| *F21K 9/238* | (2016.01) | |
| *F21S 8/08* | (2006.01) | |
| *F21V 29/77* | (2015.01) | |
| *F21K 99/00* | (2016.01) | |
| *F21V 29/503* | (2015.01) | |
| *F21V 23/00* | (2015.01) | |
| *F21V 23/06* | (2006.01) | |
| *F21V 7/00* | (2006.01) | |
| *F21V 3/00* | (2015.01) | |
| *H01R 43/00* | (2006.01) | |
| *H05B 33/08* | (2006.01) | |
| *F21V 17/02* | (2006.01) | |
| *F21W 131/10* | (2006.01) | |
| *F21V 14/04* | (2006.01) | |
| *F21Y 101/00* | (2016.01) | |
| *F21Y 115/10* | (2016.01) | |
| *F21Y 107/30* | (2016.01) | |

(52) U.S. Cl.
CPC ............ *F21V 17/02* (2013.01); *F21V 23/007* (2013.01); *F21V 23/06* (2013.01); *F21V 29/503* (2015.01); *H01R 43/00* (2013.01); *H05B 33/08* (2013.01); *H05B 33/089* (2013.01); *H05B 33/0815* (2013.01); *H05B 33/0827* (2013.01); *H05B 33/0848* (2013.01); *F21S 8/088* (2013.01); *F21V 14/04* (2013.01); *F21V 29/773* (2015.01); *F21W 2131/10* (2013.01); *F21Y 2101/00* (2013.01); *F21Y 2107/30* (2016.08); *F21Y 2115/10* (2016.08); *Y02B 20/341* (2013.01); *Y02B 20/347* (2013.01)

(56) References Cited

U.S. PATENT DOCUMENTS

| | | | |
|---|---|---|---|
| 5,243,508 A * | 9/1993 | Ewing | F21S 2/005 362/431 |
| 5,463,280 A | 10/1995 | Johnson | |
| 5,561,346 A | 10/1996 | Byrne | |
| 5,585,783 A | 12/1996 | Hall | |
| 5,655,830 A | 8/1997 | Ruskouski | |
| 5,688,042 A | 11/1997 | Madadi et al. | |
| 5,806,965 A | 9/1998 | Deese | |
| 5,947,588 A | 9/1999 | Huang | |
| 5,949,347 A | 9/1999 | Wu | |
| 6,220,722 B1 | 4/2001 | Begemann | |
| 6,227,679 B1 | 5/2001 | Zhang et al. | |
| 6,234,648 B1 | 5/2001 | Borner et al. | |
| 6,250,774 B1 | 6/2001 | Begemann et al. | |
| 6,276,822 B1 | 8/2001 | Bedrosian et al. | |
| 6,465,961 B1 | 10/2002 | Cao | |
| 6,523,978 B1 | 2/2003 | Huang | |
| 6,550,953 B1 | 4/2003 | Ichikawa et al. | |
| 6,634,770 B2 | 10/2003 | Cao | |
| 6,659,632 B2 | 12/2003 | Chen | |
| 6,709,132 B2 | 3/2004 | Ishibashi | |
| 6,787,999 B2 * | 9/2004 | Stimac | H05B 33/0803 315/51 |
| 6,803,607 B1 | 10/2004 | Chan et al. | |
| 6,848,819 B1 | 2/2005 | Arndt et al. | |
| 6,864,513 B2 | 3/2005 | Lin et al. | |
| 6,948,829 B2 | 9/2005 | Verdes et al. | |
| 6,982,518 B2 | 1/2006 | Chou et al. | |
| 7,034,607 B2 | 4/2006 | Otake | |
| 7,048,412 B2 | 5/2006 | Martin et al. | |
| 7,080,924 B2 | 7/2006 | Tseng et al. | |
| 7,086,756 B2 | 8/2006 | Maxik | |
| 7,086,767 B2 | 8/2006 | Sidwell et al. | |
| 7,144,135 B2 | 12/2006 | Martin et al. | |
| 7,165,866 B2 | 1/2007 | Li | |
| 7,172,314 B2 | 2/2007 | Currie et al. | |
| 7,291,992 B2 | 11/2007 | Miyazaki | |
| 7,322,720 B1 * | 1/2008 | Haddad | F21S 8/081 362/309 |
| 7,354,174 B1 | 4/2008 | Yan | |
| 7,396,142 B2 | 7/2008 | Laizure, Jr. et al. | |
| 7,600,882 B1 | 10/2009 | Morejon et al. | |
| 7,726,836 B2 | 6/2010 | Chen | |
| 7,824,065 B2 | 11/2010 | Maxik | |
| 8,021,025 B2 | 9/2011 | Lee | |
| 8,253,316 B2 | 8/2012 | Sun et al. | |
| 8,272,762 B2 | 9/2012 | Maxik et al. | |
| 8,274,241 B2 | 9/2012 | Guest et al. | |
| 8,277,082 B2 | 10/2012 | Dassanayake et al. | |
| 8,282,250 B1 | 10/2012 | Dassanayake et al. | |
| 8,292,468 B2 | 10/2012 | Narendran et al. | |
| 8,322,896 B2 | 12/2012 | Falicoff et al. | |
| 8,371,722 B2 | 2/2013 | Carroll | |
| 8,400,051 B2 | 3/2013 | Hakata et al. | |
| 8,415,865 B2 | 4/2013 | Liang et al. | |
| 8,421,320 B2 | 4/2013 | Chuang | |
| 8,421,321 B2 | 4/2013 | Chuang | |
| 8,421,322 B2 | 4/2013 | Carroll et al. | |
| 8,449,154 B2 | 5/2013 | Uemoto et al. | |
| 8,502,468 B2 | 8/2013 | Li et al. | |
| 8,641,237 B2 | 2/2014 | Chuang | |
| 8,653,723 B2 | 2/2014 | Cao et al. | |
| 8,696,168 B2 | 4/2014 | Li et al. | |
| 8,740,415 B2 | 6/2014 | Wheelock | |
| 8,750,671 B1 | 6/2014 | Kelly et al. | |
| 8,752,984 B2 | 6/2014 | Lenk et al. | |
| 8,760,042 B2 | 6/2014 | Sakai et al. | |
| 2004/0201990 A1 | 10/2004 | Meyer | |
| 2004/0212420 A1 | 10/2004 | Otake | |
| 2005/0231133 A1 | 10/2005 | Lys | |
| 2005/0234237 A1 | 10/2005 | Korycinska et al. | |
| 2006/0044789 A1 * | 3/2006 | Curtis | F21S 8/088 362/152 |
| 2008/0018261 A1 | 1/2008 | Kastner | |
| 2008/0157678 A1 | 7/2008 | Ito et al. | |
| 2009/0184618 A1 | 7/2009 | Hakata et al. | |
| 2009/0185105 A1 | 7/2009 | Hasegawa | |
| 2009/0323359 A1 * | 12/2009 | Scott | F21V 29/004 362/373 |
| 2010/0027258 A1 * | 2/2010 | Maxik | F21V 29/78 362/240 |
| 2010/0091495 A1 * | 4/2010 | Patrick | F21V 29/004 362/249.02 |
| 2010/0164403 A1 | 7/2010 | Liu | |
| 2011/0062872 A1 | 3/2011 | Jin et al. | |
| 2011/0063843 A1 * | 3/2011 | Cook | F21V 3/04 362/249.02 |
| 2011/0084614 A1 | 4/2011 | Eisele et al. | |
| 2011/0109248 A1 | 5/2011 | Liu | |
| 2011/0260631 A1 | 10/2011 | Park et al. | |
| 2011/0273102 A1 | 11/2011 | Van De Ven et al. | |
| 2012/0040585 A1 | 2/2012 | Huang | |
| 2012/0153866 A1 | 6/2012 | Liu | |
| 2012/0176793 A1 * | 7/2012 | Maxik | F21S 8/088 362/246 |
| 2012/0257375 A1 * | 10/2012 | Tickner | F21K 9/00 362/84 |
| 2012/0262080 A1 | 10/2012 | Watanabe et al. | |
| 2012/0287601 A1 | 11/2012 | Pickard et al. | |
| 2013/0015774 A1 | 1/2013 | Briggs | |
| 2013/0026923 A1 | 1/2013 | Athalye et al. | |
| 2013/0026925 A1 | 1/2013 | Ven et al. | |
| 2013/0069535 A1 | 3/2013 | Athalye | |
| 2013/0069547 A1 | 3/2013 | Van De Ven et al. | |
| 2013/0141003 A1 | 6/2013 | Esaki et al. | |
| 2013/0162149 A1 | 6/2013 | Van De Ven et al. | |
| 2013/0162153 A1 | 6/2013 | Van De Ven et al. | |
| 2013/0169159 A1 | 7/2013 | Lys | |
| 2013/0175934 A1 | 7/2013 | Fujita | |
| 2013/0250575 A1 * | 9/2013 | Wilcox | F21S 8/02 362/241 |
| 2013/0293135 A1 | 11/2013 | Hu et al. | |

(56) References Cited

U.S. PATENT DOCUMENTS

2014/0062333 A1    3/2014  Sonobe
2014/0232270 A1    8/2014  Kimura et al.

FOREIGN PATENT DOCUMENTS

| GB | 2345954    | A  | 7/2000  |
|----|------------|----|---------|
| JP | H09265807  | A  | 10/1997 |
| JP | 2000173304 | A  | 6/2000  |
| JP | 2001118403 | A  | 4/2001  |
| JP | 2007059930 | A  | 3/2007  |
| JP | 2008288183 | A  | 11/2008 |
| JP | 2009117346 | A  | 5/2009  |
| JP | 3153766    | U  | 9/2009  |
| JP | 2009277586 | A  | 11/2009 |
| WO | 0124583    | A1 | 4/2001  |
| WO | 0160119    | A2 | 8/2001  |
| WO | 2012011279 | A1 | 1/2012  |
| WO | 2012031533 | A1 | 3/2012  |

OTHER PUBLICATIONS

U.S. Appl. No. 14/291,829, Office Action, Aug. 11, 2016.
U.S. Appl. No. 14/292,001, Office Action, Jul. 16, 2015.
U.S. Appl. No. 14/291,829, Office Action, Nov. 20, 2015.
U.S. Appl. No. 14/291,829, Final Office Action, Apr. 18, 2016.

\* cited by examiner

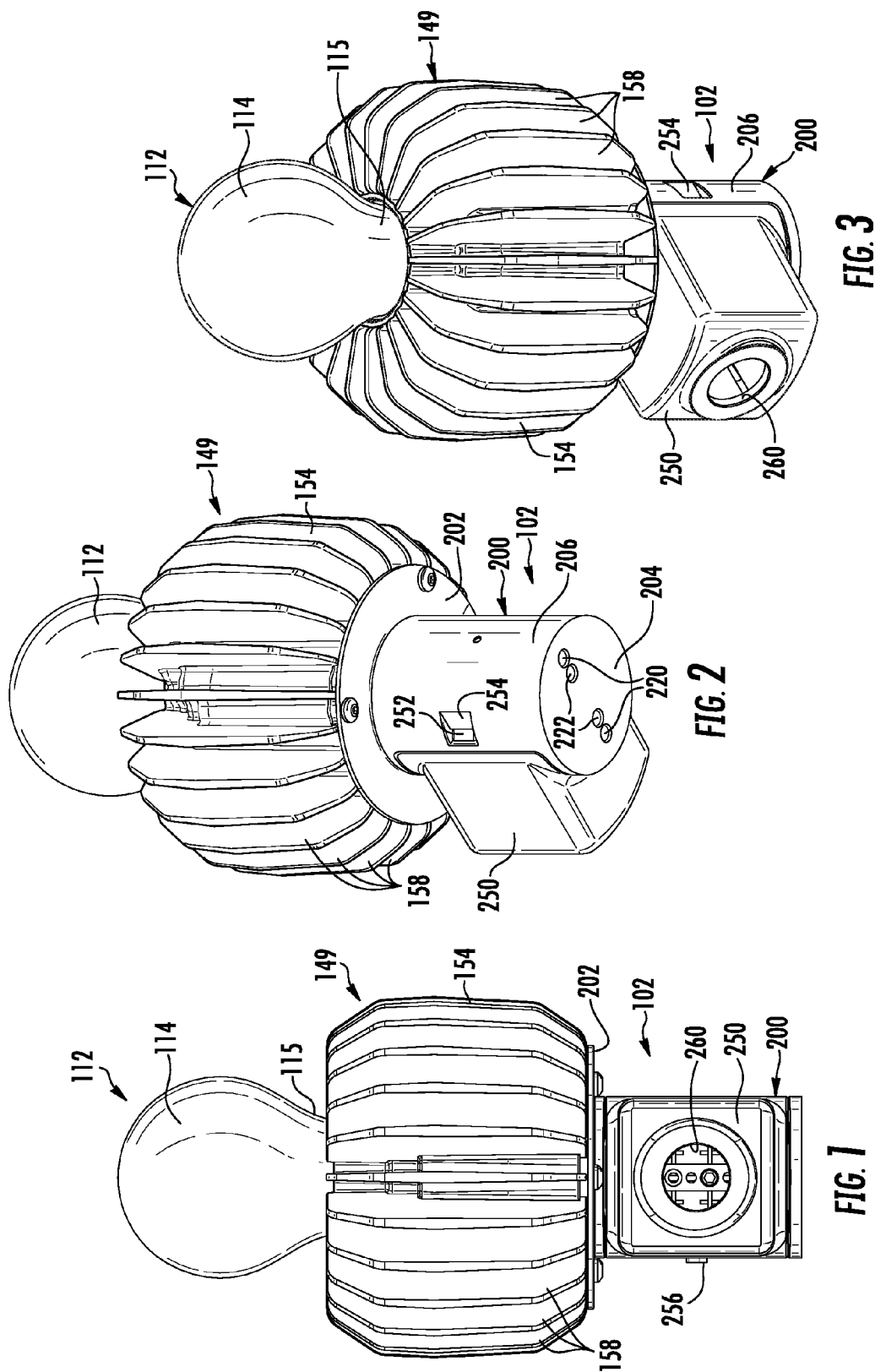

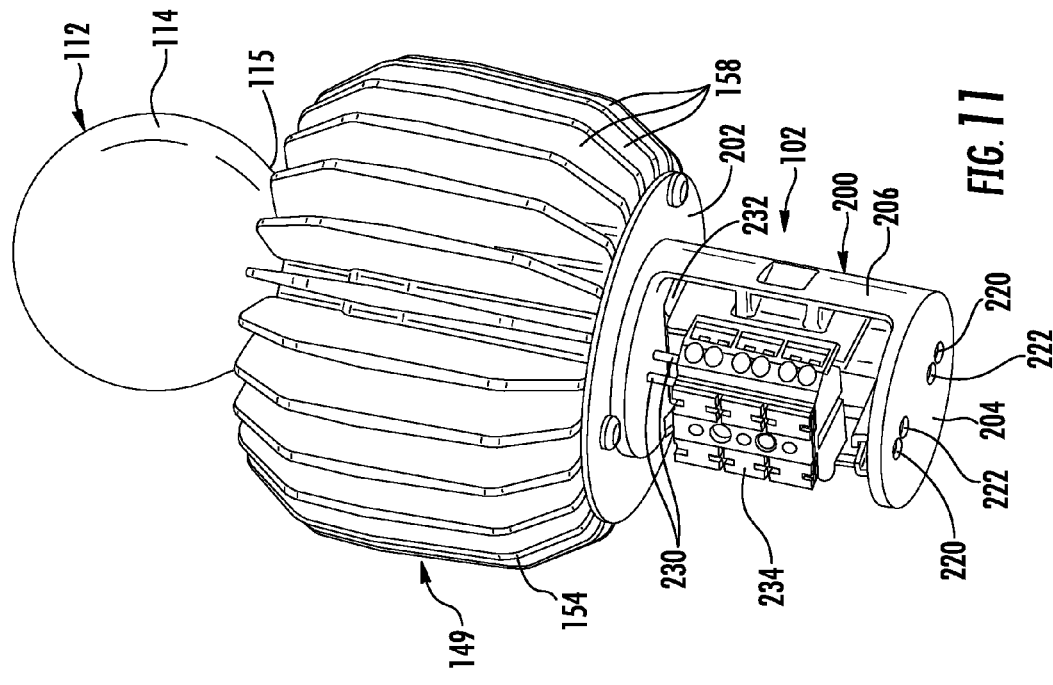
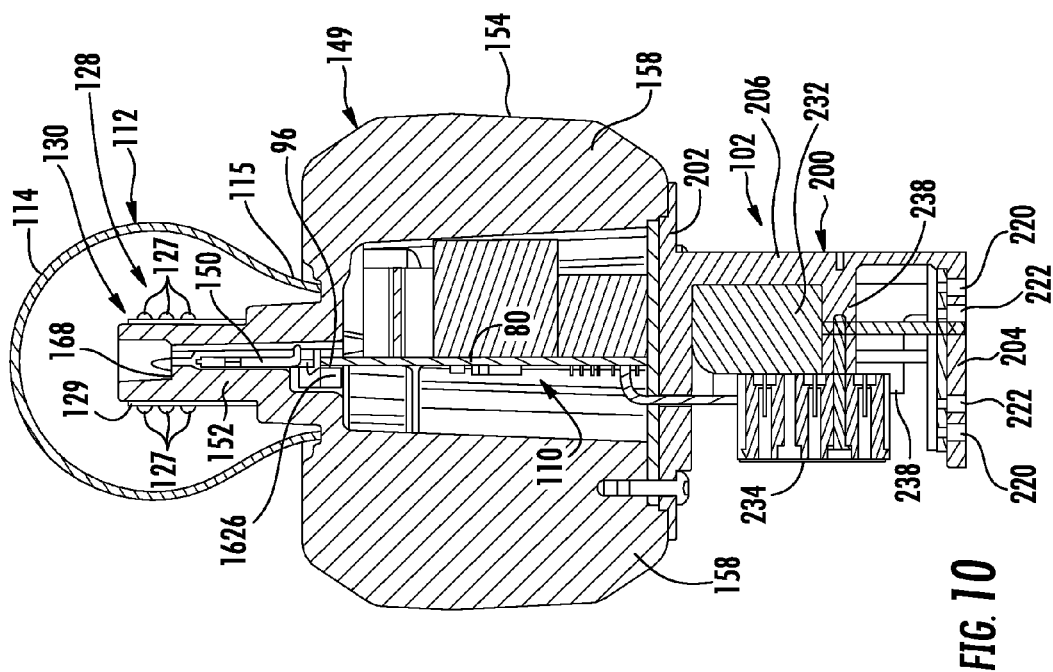

LED LAMP

This application claims benefit of priority under 35 U.S.C. §119(e) to the filing date of U.S. Provisional Application No. 61/984,467, as filed on Apr. 25, 2014, which is incorporated herein by reference in its entirety.

BACKGROUND

Light emitting diode (LED) lighting systems are becoming more prevalent as replacements for older lighting systems. LED systems are an example of solid state lighting (SSL) and have advantages over traditional lighting solutions such as incandescent and fluorescent lighting because they use less energy, are more durable, operate longer, can be combined in multi-color arrays that can be controlled to deliver virtually any color light, and generally contain no lead or mercury. A solid-state lighting system may take the form of a lighting unit, light fixture, light bulb, or a "lamp."

An LED lighting system may include, for example, a packaged light emitting device including one or more light emitting diodes (LEDs), which may include inorganic LEDs, which may include semiconductor layers forming p-n junctions and/or organic LEDs, which may include organic light emission layers. Light perceived as white or near-white may be generated by a combination of red, green, and blue ("RGB") LEDs. Output color of such a device may be altered by separately adjusting supply of current to the red, green, and blue LEDs. Another method for generating white or near-white light is by using a lumiphor such as a phosphor. Still another approach for producing white light is to stimulate phosphors or dyes of multiple colors with an LED source. Many other approaches can be taken.

An LED lamp may be made with a form factor that allows it to replace a standard incandescent bulb, or any of various types of fluorescent lamps. LED lamps often include some type of optical element or elements to allow for localized mixing of colors, collimate light, or provide a particular light pattern. Sometimes the optical element also serves as an enclosure for the electronics and or the LEDs in the lamp.

Since, ideally, an LED lamp designed as a replacement for a traditional incandescent or fluorescent light source needs to be self-contained; a power supply is included in the lamp structure along with the LEDs or LED packages and the optical components. A heatsink is also often needed to cool the LEDs and/or power supply in order to maintain appropriate operating temperature.

SUMMARY

In some embodiments a lamp for use in an existing light fixture having an electrical receptacle comprises an at least partially optically transmissive enclosure. A LED assembly comprising at least one LED located in the enclosure and operable to emit light when energized through an electrical path. A base having an external size that is approximately the same size or smaller than an external size of the electrical receptacle, the base comprising a universal mounting mechanism for mounting the lamp to the light fixture.

A heat sink may dissipate heat from the LED assembly, and the base may comprise a support structure attached to the heat sink. The support structure may enclose an interior space of the heat sink. The support structure may comprise a mounting plate and a wall that may be configured and dimensioned to have an external size that is approximately the same size or smaller than the external size of the electrical receptacle. The mounting plate may include a universal mounting structure for connecting the lamp to an existing mounting structure of the fixture. The mounting structure may comprise at least two sets of apertures. A surge protector may be provided in the electrical path. An electrical connector may be provided in the electrical path. A cover may be releasably secured to the base. A shield may be positioned to reflect some of the light emitted from the lamp. The shield may be made of a thermally conductive material and may be secured to the heat sink. The lamp may produce between approximately 2500 and 4500 Lumens. The light may have a color rendering index of greater than 70. The lamp may produce approximately 100 Lumens per Watt. The color temperature may be approximately 2800-3300 K. The mounting structure may not be in the electrical path. A tower may extend into the enclosure for supporting the LED assembly such that the LEDs may be positioned in a center of the enclosure. A heat sink for dissipating heat from the LEDs may comprise the tower that extends along the longitudinal axis of the lamp.

In some embodiments a lamp comprises an at least partially optically transmissive enclosure and a base. A LED assembly comprises is located in the enclosure and is operable to emit light when energized through an electrical path from the base. A surge protector and an electrical connector are positioned at least partially in the base and are in the electrical path. A heat sink comprises a first portion in the enclosure for supporting the LED assembly and a second portion external of the enclosure for dissipating heat. The base is connected to the heat sink.

In some embodiments a lamp comprises an omnidirectional enclosure having a first dimension. A LED assembly comprises at least one LED that is located in the enclosure and is operable to emit light when energized through an electrical path. A heat sink is thermally coupled to the LED assembly for dissipating heat from the LEDs and comprises an external heat dissipating portion having a second dimension. The second dimension corresponds to and is greater than the first dimension.

The first dimension may be a width, height or volume of the enclosure and the second dimension may be a width, height or volume of the external heat dissipating portion. The lamp may be mounted inside of a diffusive globe. The lamp may produce between approximately 2500 and 4500 Lumens, between approximately 3000 and 4000 Lumens and/or approximately 3500 Lumens. A tower may extend into the enclosure for supporting the LED assembly such that the LEDs are positioned in a center of the enclosure. A heat sink may be provided for dissipating heat from the at least one LED where the heat sink comprises the tower that extends along the longitudinal axis of the lamp.

In some embodiments an outdoor lamp comprises an omnidirectional enclosure. A LED assembly comprising at least one LED is located in the enclosure and emits light when energized through an electrical path. The at least one LED produces between approximately 2500 and 4500 Lumens. The lamp may comprise a base comprising a universal mounting mechanism for mounting the lamp to the light fixture; and a heat sink thermally coupled to the LED assembly for dissipating heat from the at least one LED.

The heat sink may comprise an external heat dissipating portion where the enclosure is mounted to a first side of the external heat dissipating portion and the base is mounted to an opposite second side of the external heat dissipating portion. The enclosure may have a first width, the base may have a second width and the external heat dissipating portion may have a third width where the third width may be greater than the first width and the second width. A tower may extend into the enclosure for supporting the LED assembly such that the at least one LED is positioned in a center of the enclosure. A heat sink may dissipate heat from the at least one LED and comprise the tower that extends along a longitudinal axis of the lamp.

In some embodiments a method of installing a lamp comprising an at least partially optically transmissive enclosure; a base having an external size that is the same size or smaller than an external size of the electrical connector and a universal mounting mechanism for mounting to the light fixture; and a LED assembly comprising at least one LED located in the enclosure and operable to emit light when energized through an electrical path from the base is provided. The method comprises positioning the base of the lamp in the space vacated by the electrical receptacle; disconnecting electrical supply wires from an electrical receptacle; removing the electrical receptacle from a space in the light fixture; inserting a lamp into the fixture; mounting the universal mounting mechanism to the fixture; and connecting the electrical supply wires to the electrical path.

The step of removing the electrical receptacle may comprise removing screws from apertures in the fixture and the universal mounting mechanism may include a first pair of apertures and a second pair of apertures wherein the step of positioning the base of the lamp in the space may include aligning the apertures with one of the first pair of apertures and the second pair of apertures. The step of connecting the electrical supply wires to the path may comprise connecting the electrical supply wires to a terminal block in the base.

BRIEF DESCRIPTION OF THE DRAWINGS

FIG. 1 is a front view of an embodiment of the lamp of the invention.

FIG. 2 is a bottom perspective view of the lamp of FIG. 1.

FIG. 3 is a top perspective view of the lamp of FIG. 1.

FIG. 10 is a section view of the lamp taken along line 10-10 of FIG. 9.

FIG. 11 is a bottom perspective view of the lamp of FIG. 1 with the cover removed.

DETAILED DESCRIPTION

Figure 4:
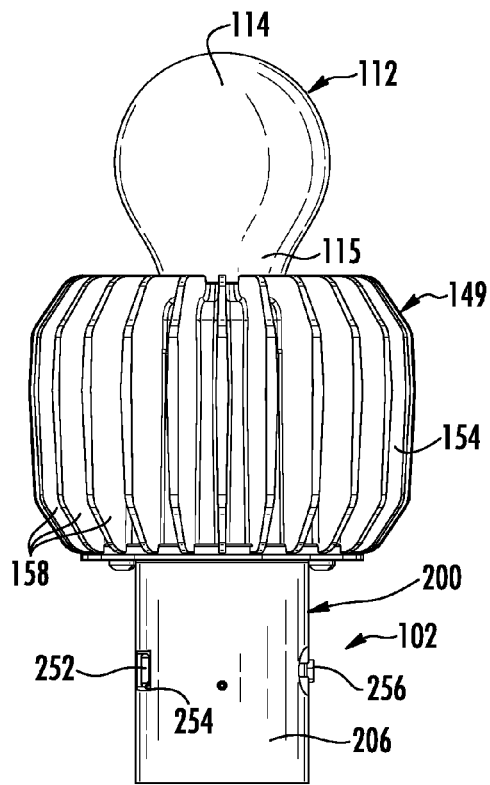
FIG. 4 is a back view of the lamp of FIG. 1.
Figure 5:
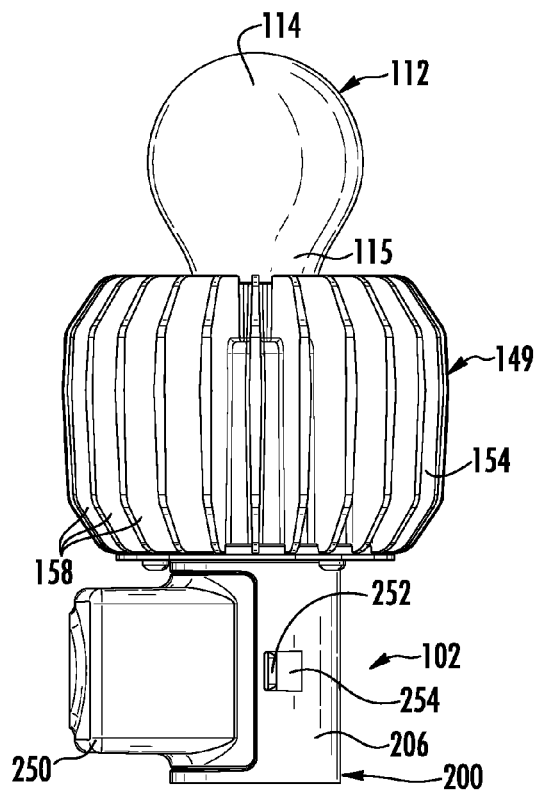
FIG. 5 is a side view of the lamp of FIG. 1.
Figure 6:
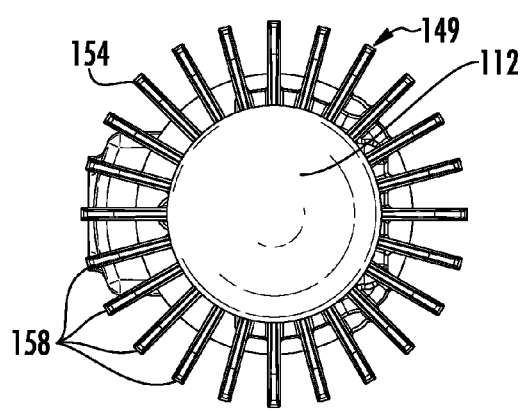
FIG. 6 is a top view of the lamp of FIG. 1.
Figure 7:
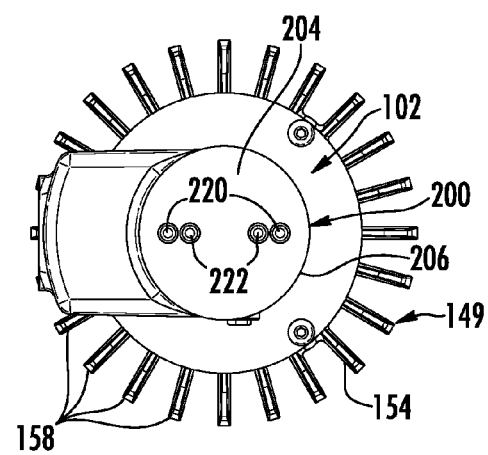
FIG. 7 is a bottom view of the lamp of FIG. 1.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" or "top" or "bottom" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The terms "LED" and "LED device" as used herein may refer to any solid-state light emitter. The terms "solid state light emitter" or "solid state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid state light emitters and/or multiple lumiphoric materials (i.e., in combination with at least one solid state light emitter) may be used in a single device, such as to produce light perceived as white or near white in character. In certain embodiments, the aggregated output of multiple solid-state light emitters and/or lumiphoric materials may generate warm white light output having a color temperature range of from about 2200K to about 6000K.

Solid state light emitters may be used individually or in combination with one or more lumiphoric materials (e.g., phosphors, scintillators, lumiphoric inks) and/or optical elements to 96 combinations of colors that may be perceived as white). Inclusion of lumiphoric (also called 'luminescent') materials in lighting devices as described herein may be accomplished by direct coating on solid state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials, may be associated with a lumiphor, a lumiphor binding medium, or a lumiphor support element that may be spatially segregated from a solid state emitter.

Figure 25:
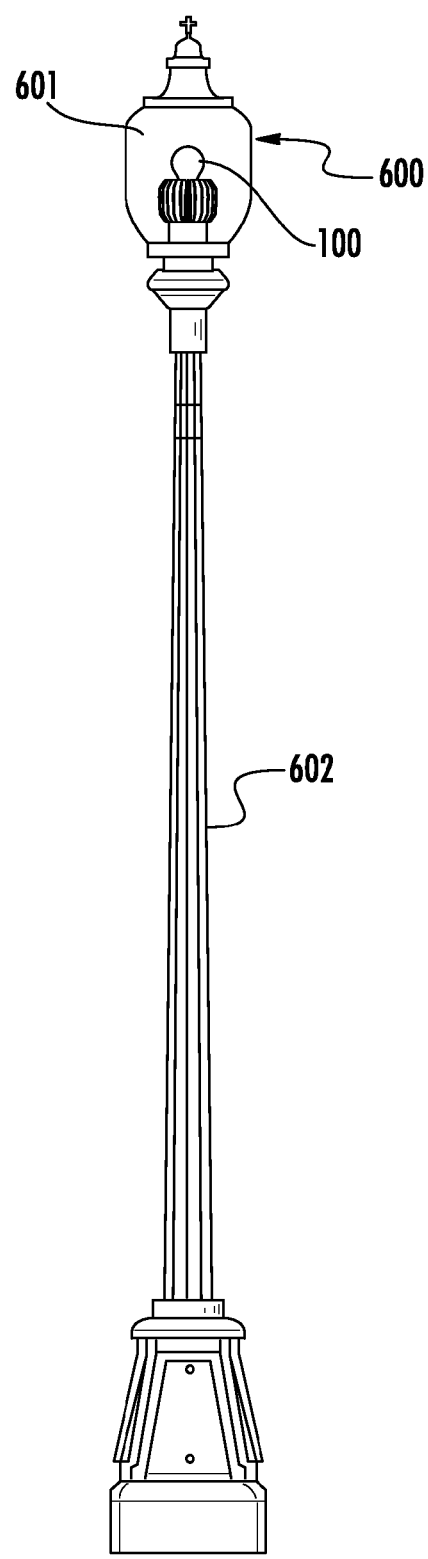
FIG. 25 is a front view of an embodiment of an Acorn light fixture having the lamp of the invention mounted on a light pole.
Figure 26:
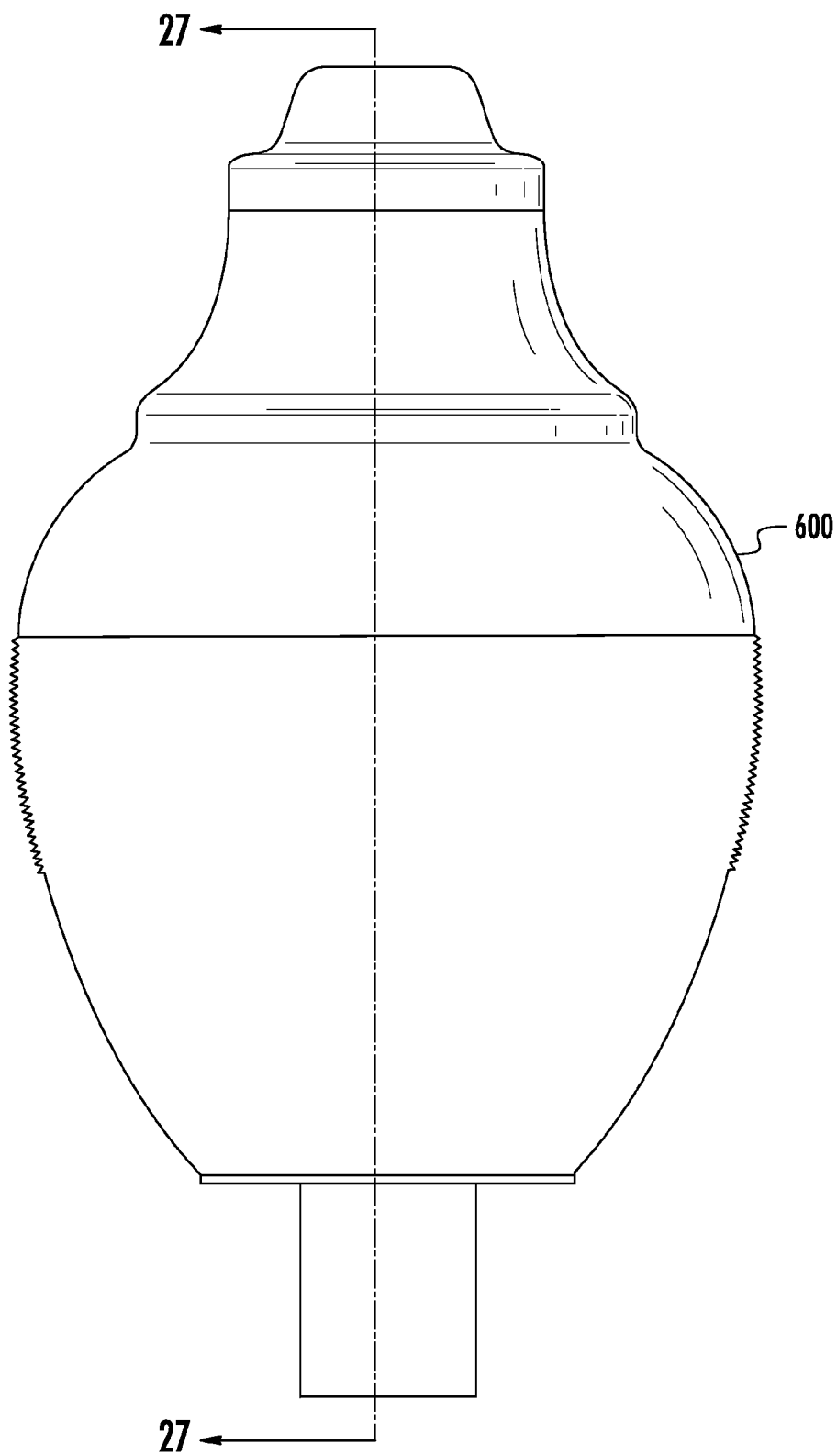
FIG. 26 is a front view of an Acorn fixture having the lamp of the invention mounted therein.

Lamps as described herein may be used as in light fixtures such as acorn street lights. One embodiment of an acorn street light is shown in FIG. 25 and comprises a fixture 600 that includes an optically transmissive globe 601, such as a glass, plastic or other optically transmissive material, that houses the lamp 100 of the invention. The lamp 100 is visible in FIG. 25, in some fixtures the globe 601 may be textured or have a diffuser such that the lamp 100 is not readily visible and in other embodiments the globe 600 may be clear. The fixture 600 may be mounted on a lamp pole 602 for providing illumination such as along, paths, roads and the like. Traditionally, the globe 601 has the general shape of an acorn; however, the globe may have any suitable shape and size. In a typical acorn light an omnidirectional bulb having a screw connector is connected to an electrical receptacle such as a Mogul or medium socket such that the bulb is supported in the fixture and is electrically coupled to a power source. The lamp of the invention 100 may be used to replace a traditional incandescent bulb in an acorn light. While an embodiment of an acorn light fixture is shown and described herein, it is to be understood that the lamp of the invention may be used in a wide variety of lights, fixtures and the like.

Embodiments of a solid-state lamp are shown and described herein comprising a LED assembly 130 with light emitting LEDs 127 as shown in FIGS. 10, 13, 18, 27 and 28. Multiple LEDs 127 can be used together, forming an LED array 128. The LEDs 127 in the LED array 128 may comprise an LED die disposed in an encapsulant such as silicone, and/or LEDs which are encapsulated with a phosphor to provide local wavelength conversion. A wide variety of LEDs and combinations of LEDs may be used in the LED assembly 130. The LEDs 127 of the LED array 128 are operable to emit light when energized through an electrical path. The term "electrical path" is used to refer to the electrical path to the LED's 127, and may include an intervening power supply, drivers and/or other lamp electronics, and includes the electrical connection between the electrical connector that provides power to the lamp and the LED array. The term may also be used to refer to the electrical connection between the power supply and the LEDs and between the electrical connector to the lamp and the power supply. Electrical conductors run between the LEDs 127 and the lamp base 102 to carry both sides of the supply to provide critical current to the LEDs 127 as will be described. The LEDs 127 may be mounted on a submount 129 that may form a part of the electrical path to the LEDs. In the present invention the term "submount" is used to refer to the support structure that supports the individual LEDs or LED packages and in may comprise a printed circuit board, metal core printed circuit board, lead frame extrusion, FR4 board, flex circuit or the like or combinations of such structures. The electrical path runs between the submount 129 and the electrical connector in the lamp base 102 to carry both sides of the supply to provide critical current to the LEDs 127.

In some embodiments, the submount 129 may be made of or comprise a thermally conductive material. The submount 129 may comprise a LED mounting portion that functions to mechanically support and electrically couple the LEDs 127 to the electrical path and a second connector portion that functions to provide thermal, electrical and/or mechanical connections to the LED assembly 130.

In some embodiments of LED assembly 130 the submount 129 may comprise a metal core board such as a metal core printed circuit board (MCPCB). The metal core board comprises a thermally and electrically conductive core made of aluminum or other similar pliable metal material. The core is covered by a dielectric material such as polyimide.

Metal core boards allow traces to be formed therein. In one method, the submount 129 is formed as a flat member and is bent into a suitable shape such as a cylinder, sphere, polyhedra or the like.

In some embodiments the submount 129 of the LED assembly 130 may comprise a lead frame made of an electrically conductive material such as copper, copper alloy, aluminum, steel, gold, silver, alloys of such metals, thermally conductive plastic or the like. In another embodiment of the LED assembly 130 the submount 129 may comprise a hybrid of a MCPCB and lead frame. The MCPCB may form the LED mounting portion on which the LED packages containing LEDs 127 are mounted where the back side of the metal core board may be mechanically coupled to a lead frame structure. The lead frame structure may form the connector portion. Both the lead frame and the metal core board may be bent into the various configurations as discussed herein.

The LED assembly may also comprise a PCB made with FR4, which may comprise thermal vias, where the thermal vias may then be connected to the lead frame structure. The LED assembly may also comprise a PCB FR4 without a lead frame structure. A PCB FR4 board comprises a thin layer of copper foil laminated to one side, or both sides, of an FR4 glass epoxy panel. The FR4 copper-clad sheets comprise circuitry etched into copper layers to make the PCB FR4 board.

In another embodiment of LED assembly 130 the submount 129 may comprise a flex circuit. A flex circuit may comprise a flexible layer of a dielectric material such as a polyimide, polyester or other material to which a layer of copper or other electrically conductive material is applied such as by adhesive. Electrical traces are formed in the copper layer to form electrical pads for mounting the electrical components such as LEDs 127 on the flex circuit and for creating the electrical path between the components.

The submount 129 may be bent or folded or otherwise formed such that the LEDs 127 provide the desired light pattern in lamp 100. The angles of the LEDs and the number of LEDs may be varied to create a desired light pattern. In the illustrated embodiments the submount 129 is formed to have a generally cylindrical shape; however, the submount may have other shapes. The LED assembly 130 may be advantageously formed into any suitable three-dimensional shape. A "three-dimensional" LED assembly as used herein means a LED assembly where the submount 129 comprises mounting surfaces for different ones of the LEDs that are in different planes such that the LEDs mounted on those mounting surfaces are also oriented in different planes. In some embodiments the planes are arranged such that the LEDs are disposed over a 360 degree range.

The LED assembly 130 may be contained in an optically transmissive enclosure 112 through which light emitted by the LEDs 127 is transmitted to the exterior of the lamp. The enclosure 112 may be entirely optically transmissive where the entire enclosure 112 defines the exit surface through which light is emitted from the lamp. The enclosure 112 may have a traditional bulb shape having a globe shaped main portion 114 that narrows to a neck 115. The enclosure 112 may be made of glass, quartz, borosilicate, silicate, polycarbonate, other plastic or other suitable material. In some embodiments, the exit surface of the enclosure may be coated on the inside with silica, providing a diffuse scattering layer that produces a more uniform far field pattern. The enclosure may also be etched, frosted or coated to provide the diffuser. In other embodiments the enclosure may be made of a material such as polycarbonate where the diffuser is created by the polycarbonate material. Alternatively, the surface treatment may be omitted and a clear enclosure may be provided. The enclosure may also be provided with a shatter proof or shatter resistant coating. It should also be noted that in this or any of the embodiments shown here, the optically transmissive enclosure or a portion of the optically transmissive enclosure could be coated or impregnated with phosphor. In a directional lamp the enclosure may be only partially optically transmissive where the enclosure comprises an optically transmissive exit surface through which light is emitted from the lamp and a reflective surface that reflects a portion of the light to the exit surface such that the emitted light may have a desired directional pattern.

The submount 129 may comprise a series of anodes and cathodes arranged in pairs for connection to the LEDs 127. In the some embodiments 20 pairs of anodes and cathodes are shown for an LED assembly having 20 LEDs 127; however, a greater or fewer number of anode/cathode pairs and LEDs may be used. Moreover, more than one submount may be used to make a single LED assembly 130. Electrical connectors or conductors such as traces connect the anode from one pair to the cathode of the adjacent pair to provide the electrical path between the anode/cathode pairs during operation of the LED assembly 130. An LED or LED package containing at least one LED 127 is secured to each anode and cathode pair where the LED/LED package spans the anode and cathode. The LEDs/LED packages may be attached to the submount by soldering. In one embodiment, the exposed surfaces of the submount 129 may be coated with silver, white plastic or other reflective material to reflect light inside of enclosure 112 during operation of the lamp. The submount 129 may have a variety of shapes, sizes and configurations.

LEDs and/or LED packages used with an embodiment of the invention and can include light emitting diode chips that emit hues of light that, when mixed, are perceived in combination as white light. Phosphors can be used as described to add yet other colors of light by wavelength conversion. For example, blue or violet LEDs can be used in the LED assembly of the lamp and the appropriate phosphor can be in any of the ways mentioned above. LED devices can be used with phosphorized coatings packaged locally with the LEDs or with a phosphor coating the LED die as previously described. For example, blue-shifted yellow (BSY) LED devices, which typically include a local phosphor, can be used with a red phosphor on or in the optically transmissive enclosure or inner envelope to create substantially white light, or combined with red emitting LED devices in the array to create substantially white light.

A lighting system using the combination of BSY and red LED devices referred to above to make substantially white light can be referred to as a BSY plus red or "BSY+R" system. In such a system, the LED devices used include LEDs operable to emit light of two different colors. A further detailed example of using groups of LEDs emitting light of different wavelengths to produce substantially while light can be found in issued U.S. Pat. No. 7,213,940, which is incorporated herein by reference in its entirety.

The LED assembly 130 may be mounted to a heat sink structure 149 and an electrical interconnect 150 may provide the electrical connection between the LED assembly 130 and the lamp electronics 110. The heat sink structure 149 comprises a heat conducting portion or tower 152 and a heat dissipating portion 154. In one embodiment the heat sink 149 is made as a one-piece member of a thermally conductive material such as aluminum, zinc or the like. The heat sink structure 149 may also be made of multiple components secured together to form the heat structure. Moreover, the heat sink 149 may be made of any thermally conductive material or combinations of thermally conductive materials. In some embodiments a heat sink structure may not be used.

The heat conducting portion 152 may be formed as a tower that is dimensioned and configured to make good thermal contact with the LED assembly 130 such that heat generated by the LED assembly 130 may be efficiently transferred to the heat sink 149. In one embodiment, the heat conducting portion 152 comprises a tower that extends along the longitudinal axis of the lamp and extends into the center of the enclosure 112. The heat conducting portion 152 may comprise generally cylindrical outer surface that matches the generally cylindrical internal surface of the LED assembly 130. The heat dissipating portion 154 is in good thermal contact with the heat conducting portion 152 such that heat conducted away from the LED assembly 130 by the heat conducting portion 152 may be efficiently dissipated from the lamp 100 by the heat dissipating portion 154. The heat dissipating portion 154 extends from the interior of the enclosure 112 to the exterior of the lamp 100 such that heat may be dissipated from the lamp to the ambient environment. A plurality of heat dissipating members 158 may be formed on the exposed portion to facilitate the heat transfer to the ambient environment. In one embodiment, the heat dissipating members 158 comprise a plurality fins that extend outwardly to increase the surface area of the heat dissipating portion 154. The heat dissipating portion 154 and fins 158 may have any suitable shape and configuration.

The LED assembly 130 may be mounted on the heat conducting portion 152 such that the LED array 128 is substantially in the center of the enclosure 112 such that the LED's 127 are positioned at the approximate center of enclosure 112. As used herein the terms "center of the enclosure" refers to the vertical position of the LEDs in the enclosure as being aligned with the approximate largest diameter area of the globe shaped main body 114. "Vertical" as used herein means along the longitudinal axis of the bulb where the longitudinal axis extends from the base to the free end of the bulb. In one embodiment, the LED array 128 is arranged in the approximate location that the visible glowing filament is disposed in a standard incandescent bulb. The terms "center of the enclosure" does not necessarily mean the exact center of the enclosure and is used to signify that the LEDs are located along the longitudinal axis of the lamp at a position between the ends of the enclosure near a central portion of the enclosure.

Figure 15:
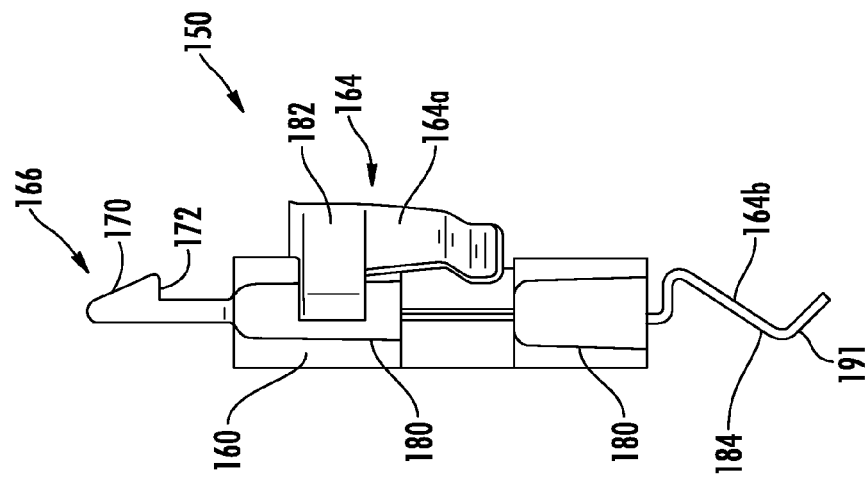
FIG. 15 is a side view of the electrical interconnect of FIG. 14.
Figure 14:
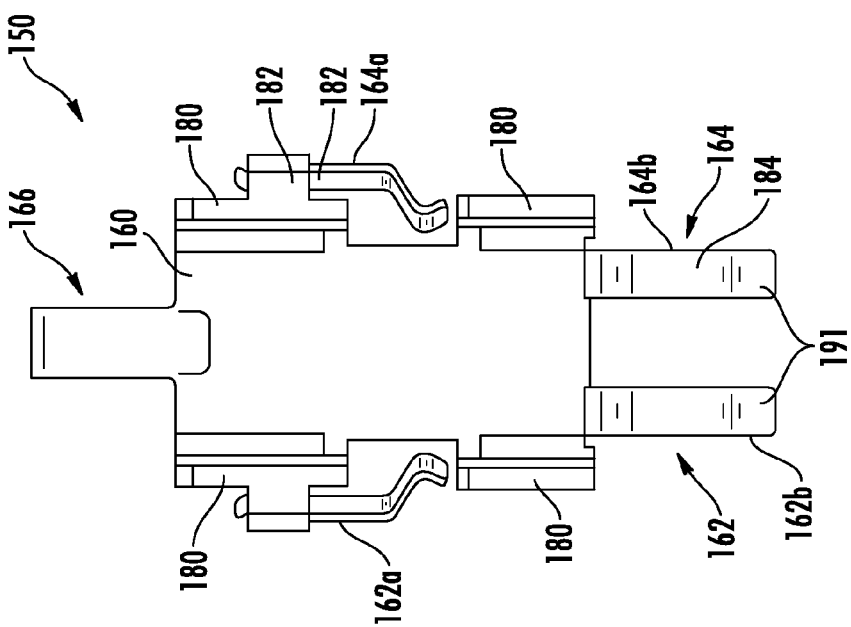
FIG. 14 is a front view of an embodiment of the electrical interconnect usable in the lamp of the invention.
Figure 17:
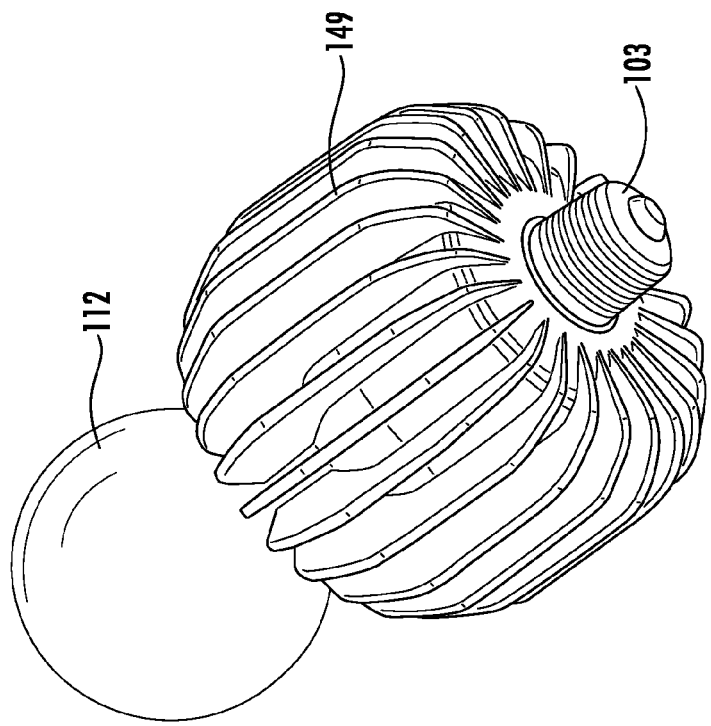
FIG. 17 is a bottom perspective view of the lamp of FIG. 16.
Figure 16:
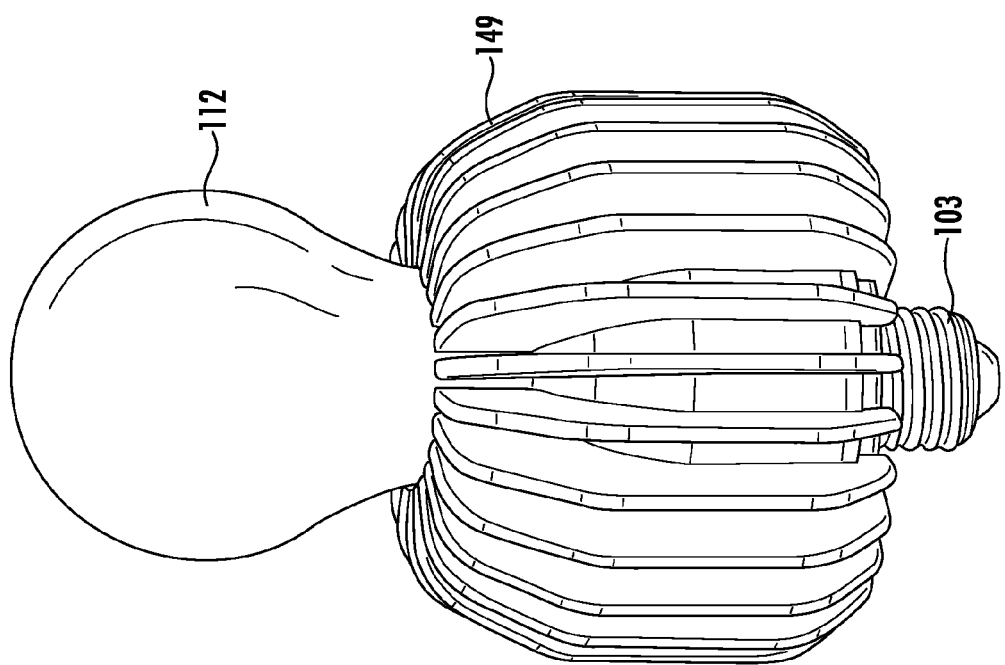
FIG. 16 is a perspective view of another embodiment of the lamp of the invention.
Figure 18:
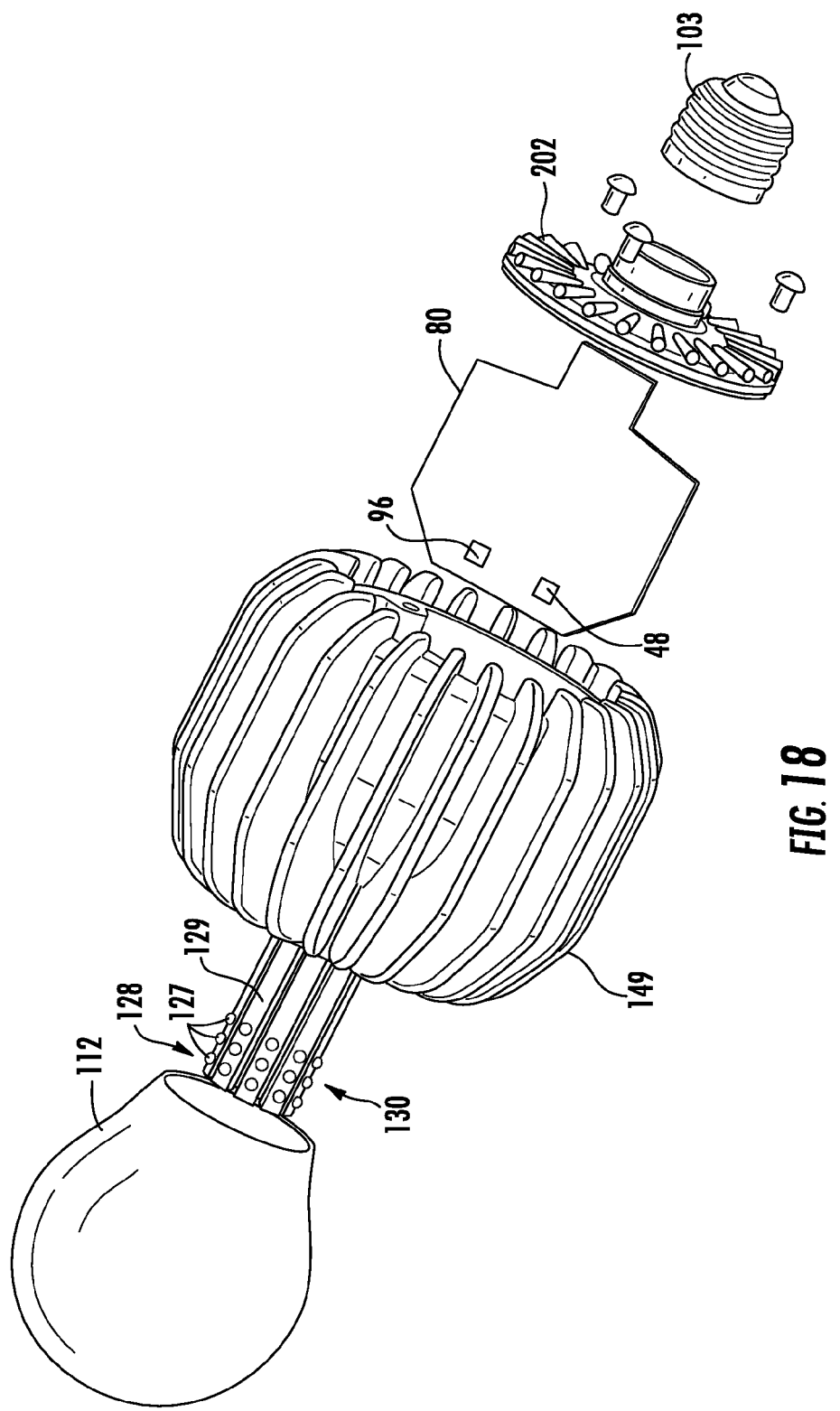
FIG. 18 is an exploded view of the lamp of FIG. 16.
Figure 20:
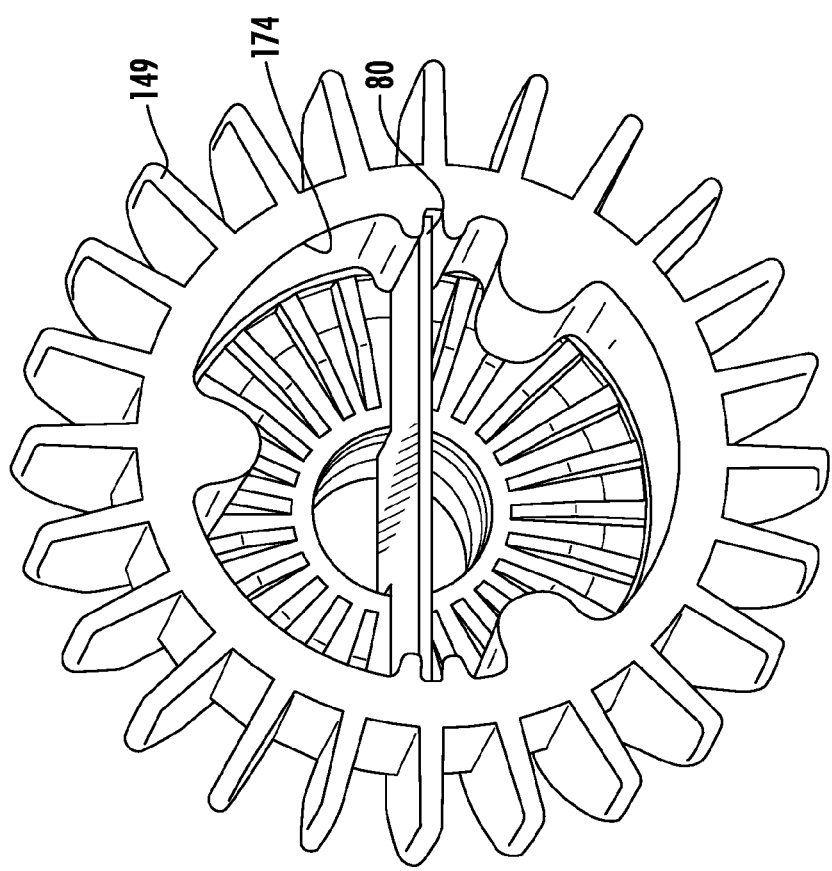
FIGS. 19 and 20 are section views through the heat sink showing the mounting of the lamp electronics board in the heat sink.
Figure 19:
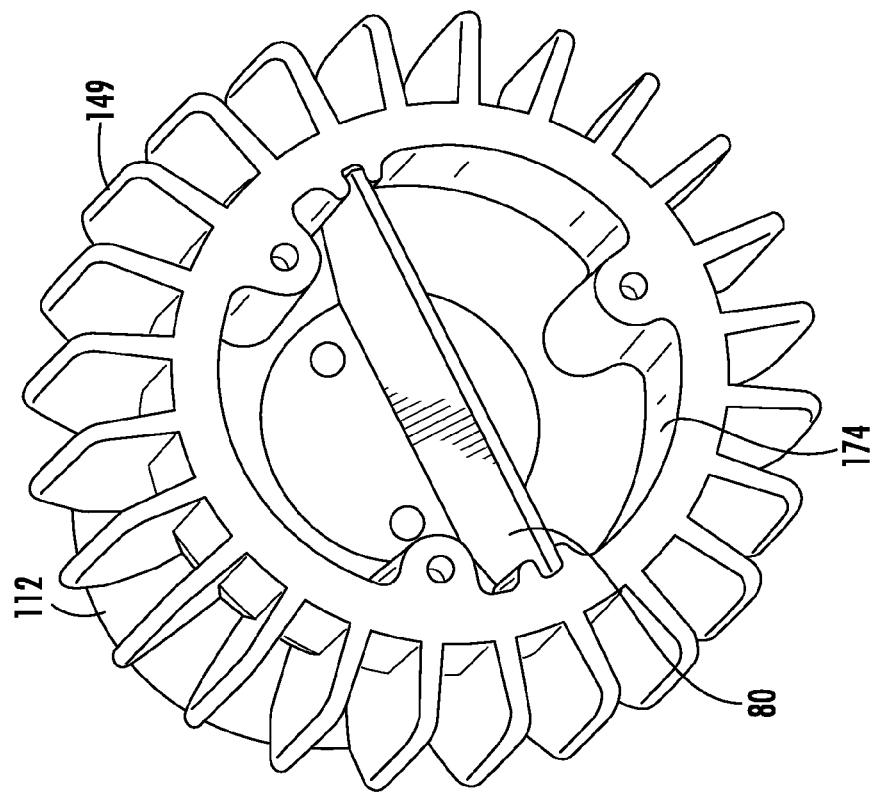
Figure 21:
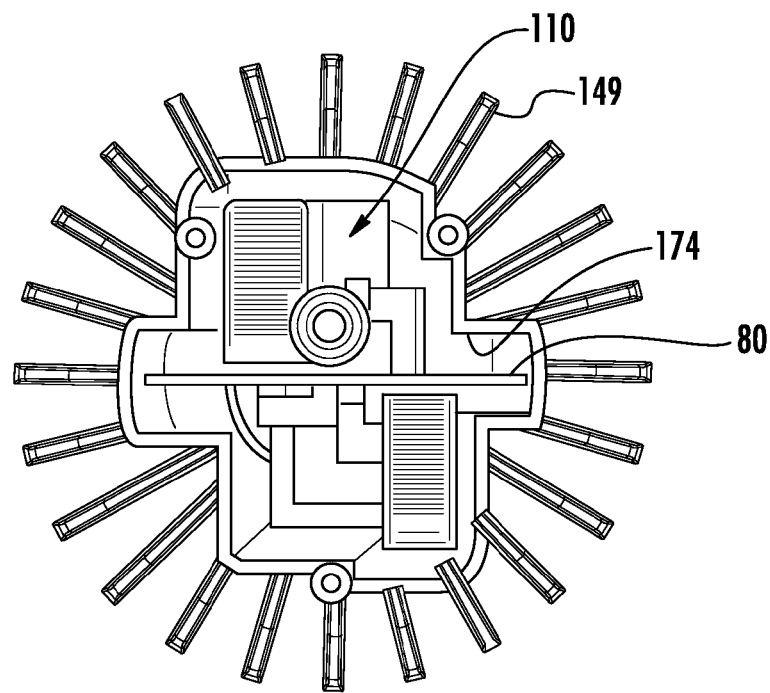
FIGS. 21 and 22 are end views of the heat sink showing alternating embodiments of the mounting of the lamp electronics in the heat sink.

Referring to FIGS. 10, 14 and 15 the electrical interconnect 150 comprises electrical conductors that form part of the electrical path connecting the LED assembly 130 to the lamp electronics 110. The interconnect 150 provides an electrical connection between the LED assembly 130 and the lamp electronics 110 that does not require bonding of the contacts from the lamp electronics 110 to the LED assembly 130.

As shown in the figures, the electrical interconnect 150 comprises a body 160 that includes a first conductor 162 for connecting to one of the anode or cathode side of the LED assembly 130 and a second conductor 164 for connecting to the other one of the anode or cathode side of the LED assembly 130. The first conductor 162 extends through the body 160 to form an LED-side contact 162a and a lamp electronics-side contact 162b. The second conductor 164 extends through the body 160 to form an LED-side contact 164a and a lamp electronics-side contact 164b. The body 160 may be formed by insert molding the conductors 162, 164 in a plastic insulator body 160. While the electrical interconnect 150 may be made by insert molding the body 160, the electrical interconnect 150 may be constructed in a variety of manners. For example, the body 160 may be made of two body sections that are joined together to trap the conductors 162, 164 between the two body sections. Further, each conductor may be made of more than one component provided an electrical pathway is provided in the body 160.

The electrical interconnect 150 may be inserted into the cavity 174 of the heat sink 149 from the bottom of the heat sink 149 and moved toward the opposite end of the heat sink such that the camming surface 170 of finger 166 contacts the fixed member 168. The engagement of the camming surface 170 with the fixed member 168 deforms the finger 166 to allow the lock member 172 to move past the fixed member 168. As the lock member 172 passes the fixed member 168 the finger 166 returns toward its undeformed state such that the lock member 172 is disposed behind the fixed member 168. The engagement of the lock member 172 with the fixed member 168 fixes the electrical interconnect 150 in position in the heat sink 149. The snap-fit connection allows the electrical interconnect 150 to be inserted into and fixed in the heat sink 149 in a simple insertion operation without the need for any additional connection mechanisms, tools or assembly steps. The tabs 180 are positioned in the slots 176, 178 such that as the electrical interconnect 150 is inserted into the heat sink 149, the tabs 180 engage the slots 176, 178 to guide the electrical interconnect 150 into the heat sink 149.

The first LED-side contact 162a and the second LED-side contact 164a are arranged such that the contacts extend through the first and second slots 176, 178, respectively, as the electrical interconnect 150 is inserted into the heat sink 149. The contacts 162a, 164a are exposed on the outside of the heat conducting portion 152. The contacts 162a, 164a are arranged such that they create an electrical connection to the anode side and the cathode side of the LED assembly 130 when the LED assembly 130 is mounted on the heat sink 149. In the illustrated embodiment the contacts are identical such that specific reference will be made to contact 164a. The contact 164a comprises a laterally extending portion 182 that extends from the body 160 and that extends through the slot 178. The laterally extending portion 182 connects to a spring portion 182 that is arranged such that it extends over the heat conducting portion 152 and abuts or is in close proximity to the outer surface of the heat conducting portion 152. The contact 164a is resilient such that it can be deformed to ensure a good electrical contact with the LED assembly 130.

The first electronic-side contact 162b and the second electronic-side contact 164b are arranged such that the contacts 162b, 164b extend beyond the bottom of the heat sink 149 when the electrical interconnect 150 is inserted into the heat sink 149. The contacts 162b, 164b are arranged such that they create an electrical connection to the anode side and the cathode side of the lamp electronics 110. In the illustrated embodiment the contacts 162b, 164b are identical such that specific reference will be made to contact 164b. The contact 164b comprises a spring portion 184 that is arranged such that it extends generally away from the electrical interconnect 150. The contact 164b is resilient such that it can be deformed to ensure a good electrical contact with the lamp electronics 110. The lamp electronics 110 include a first contact pad 96 and a second contact pad 98 (FIG. 18) that are contacted by the contacts 162b, 164b to provide the electrical coupling between the lamp electronics 110 and the LED assembly 130 in the lamp. Contact pads 96 and 98 may be formed on electronics board 80 and may be electrically coupled to the power supply, including, for example, large capacitor and EMI components that are across the input AC line, along with the driver circuitry as described herein.

The LED assembly 130 comprises an anode side contact 186 and a cathode side contact 188. The contacts 186, 188 may be formed as part of the conductive submount 129 on which the LEDs are mounted. The contacts 186, 188 are electrically coupled to the LEDs 127 such that they form part of the electrical path between the lamp electronics 110 and the LED assembly 130. The contacts 186, 188 extend from the LED mounting portion 151 such that when the LED assembly 130 is mounted on the heat sink 149 the contacts 186, 188 are disposed between the LED-side contacts 162a, 164a, respectively, and the heat sink 149. The LED-side contacts 162a, 164a are arranged such that as the contacts 186, 188 are inserted behind the LED-side contacts 162a, 164a, the LED-side contacts 162a, 164a are slightly deformed. Because the LED-side contacts 162a, 164a are resilient, a bias force is created that biases the LED-side contacts 162a, 164a into engagement with the LED assembly 130 contacts 186, 188 to ensure a good electrical coupling between the LED-side contacts 162a, 164a and the LED assembly 130. The engagement between biased contacts of the electrical interconnect 150 and the and the anode side contacts and the cathode side contacts of the LED assembly 130 and electronics board 80 is referred to herein as a contact coupling where the electrical coupling is created by the pressure contact between the contacts as distinguished from a soldered coupling.

To position the LED assembly 130 relative to the heat sink and to fix the LED assembly 130 to the heat sink, a pair of extensions 190 may be provided on the LED assembly 130 that engage mating receptacles 192 formed on the heat sink. In one embodiment the extensions 190 comprise portions of the submount 129 that extend away from the LED mounting area 151 of the LED assembly 130. The extensions 190 extend toward the bottom of the heat sink 149 along the direction of insertion of the LED assembly 130 onto the heat sink. The heat sink 149 is formed with mating receptacles 192 that are dimensioned and arranged such that one of the extensions 190 is inserted into each of the receptacles 192 when the heat sink 149 is inserted into the LED assembly 130. The engagement of the extensions 190 and the receptacles 192 properly positions the LED assembly 130 relative to the heat sink during assembly of the lamp.

Figure 13:
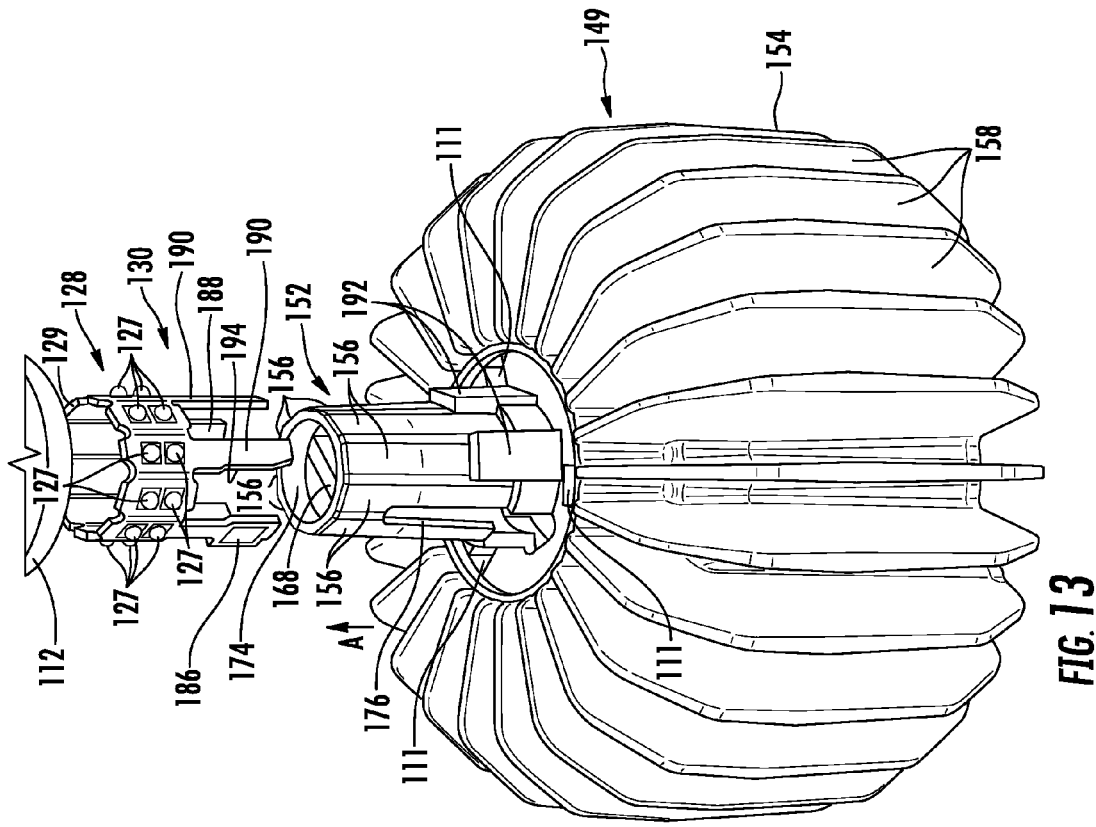
FIG. 13 is a perspective view of an embodiment of the heat sink and LED assembly lamp usable in the lamp of the invention.

To fix the LED assembly 130 on the heat sink 149 and to seat the LED assembly 130 against the heat conducting portion 152 to ensure good thermal conductivity between these elements, the extensions 190 are formed with camming surfaces 194 that engage the receptacles 192 and clamp the LED assembly 130 on the heat sink 149. The engagement of the extensions 190 with the receptacles 192 is used to hold the LED assembly 130 in the desired shape and to clamp the LED assembly 130 on the heat sink. As shown in FIG. 13 a surface of each of the extensions 190 is formed with a camming surface 194 where the camming surface 194 is created by arranging the surface 194 an angle relative to the insertion direction of the LED assembly 130 on the heat sink 149, or as a stepped surface, or as a curved surface or as a combination of such surfaces. As a result, as each extension 190 is inserted into the corresponding receptacle 192 the wall of the receptacle 192 engages the camming surface 194 and, due to the angle or shape of the camming surface 194, exerts a force on the LED assembly 130 tending to move one free end 129a of the LED assembly 130 toward the opposite free end 129b of the LED assembly 130. The extensions 190 are formed at or near the free ends of the LED assembly 130 and the camming surfaces 194 are arranged such that the free ends 129a, 129b of the LED assembly 130 are moved in opposite directions toward one another. As the free ends of the LED assembly 130 are moved toward one another, the inner circumference of the LED assembly 130 is gradually reduced such that the LED assembly 130 exerts an increasing clamping force on the heat conducting portion 152 as the LED assembly 130 is inserted on the heat sink 149. The camming surfaces 194 are arranged such that when the LED assembly 130 is completely seated on the heat sink 149 the LED assembly 130 exerts a tight clamping force on the heat conducting portion 152. The clamping force holds the LED assembly 130 on the heat sink 149 and ensures a tight surface-to-surface engagement between the LED assembly 130 and the heat sink 149 such that heat generated by the LED assembly 130 is efficiently transferred to the heat sink 149. The LED submount 129 is under radial tension on the heat sink 149. In other embodiments the LED assembly 130 may be fixed to the heat sink 149 in a variety of manners including mechanical connectors, adhesive or the like.

When the electrical interconnect 150 is mounted to the heat sink 149 and the LED assembly 130 is mounted on the heat sink 149, an electrical path is created between the electronics-side contacts 162a, 164a of the electrical interconnect 150 and the LED assembly 130 and between the lamp electronics-side contacts 162b, 164b and the pads 96, 98 on the electronics board 80. These components are physically and electrically connected to one another and the electrical path is created without using any additional fasteners, connection devices, tools or additional assembly steps.

Figure 12:
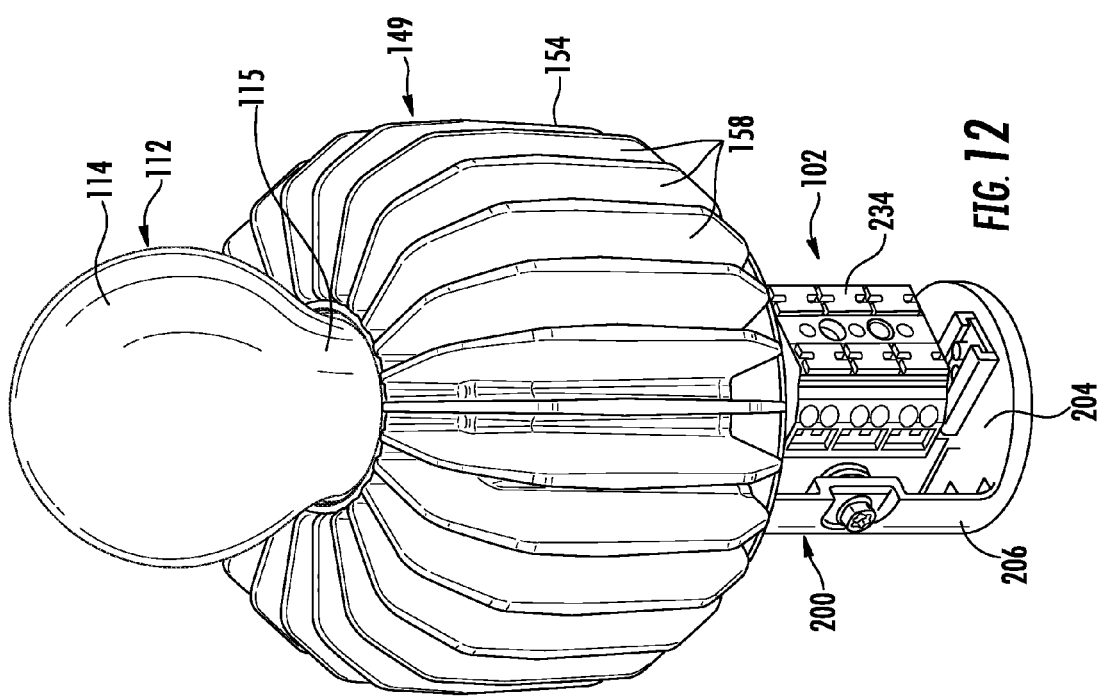
FIG. 12 is a top perspective view of the lamp of FIG. 1 with the cover removed.
Figure 22:
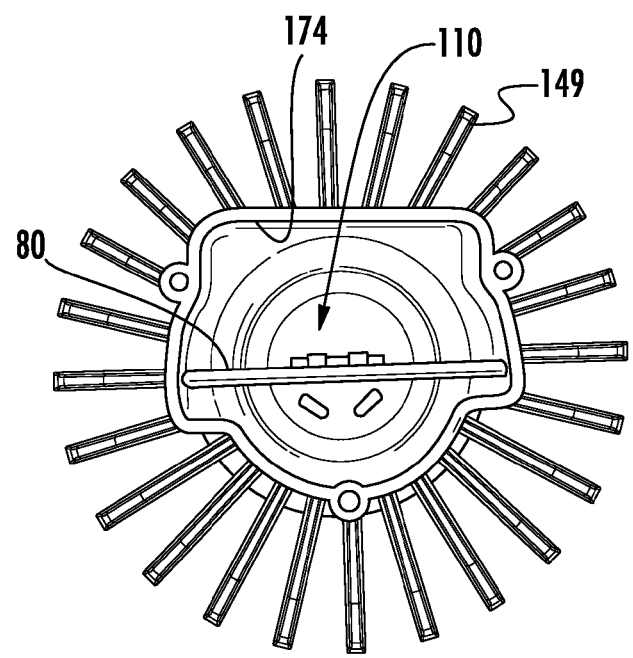
Figure 23:
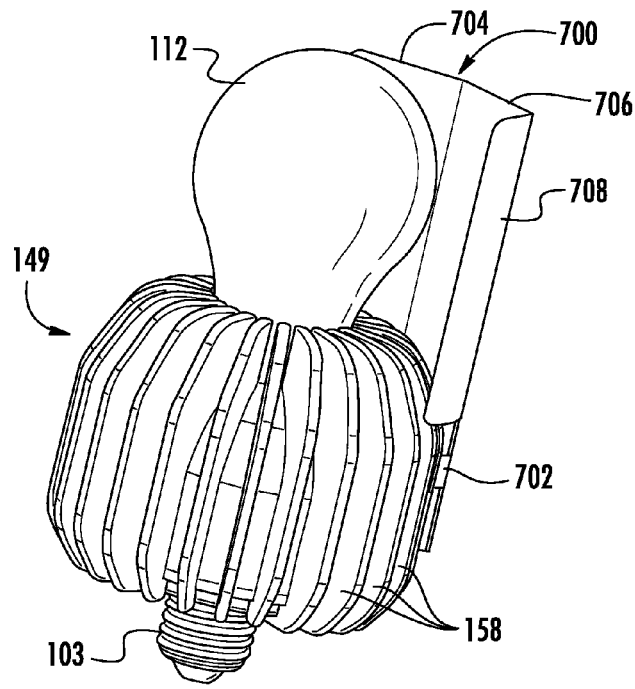
FIGS. 23 and 24 are perspective views showing an embodiment of a shield mounted on the lamp of the invention.
Figure 24:
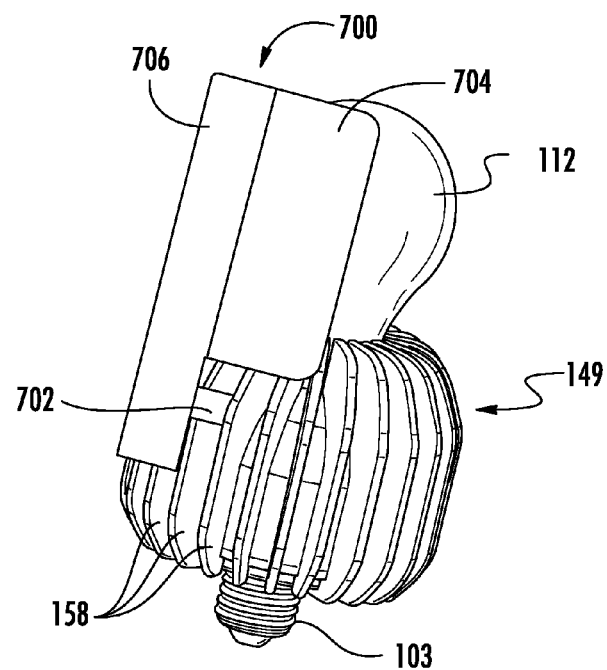

In some embodiments, a driver and/or power supply may be included with the LED array 128 on the submount 129. In other embodiments the lamp electronics 110 such as the driver and/or power supply are mounted on electronics board 80 and may be located at least partially in an internal cavity 174 the heat sink 149 as shown for example in FIGS. 12 and 22 where the size and shape of the heat sink may be configured to house the lamp electronics 110. The power supply and drivers may also be mounted separately where components of the power supply are mounted in the heat sink 149 and the driver is mounted with the submount 129 in the enclosure 112. The heat sink 149 may include a power supply or driver and form all or a portion of the electrical path between the mains and the LEDs 127. The heat sink 149 may also include only part of the power supply circuitry while some smaller components reside on the submount 129. Suitable power supplies and drivers are described in U.S. patent application Ser. No. 13/462,388 filed on May 2, 2012 and titled "Driver Circuits for Dimmable Solid State Lighting Apparatus" which is incorporated herein by reference in its entirety; U.S. patent application Ser. No. 12/775,842 filed on May 7, 2010 and titled "AC Driven Solid State Lighting Apparatus with LED String Including Switched Segments" which is incorporated herein by reference in its entirety; U.S. patent application Ser. No. 13/192,755 filed Jul. 28, 2011 titled "Solid State Lighting Apparatus and Methods of Using Integrated Driver Circuitry" which is incorporated herein by reference in its entirety; U.S. patent application Ser. No. 13/339,974 filed Dec. 29, 2011 titled "Solid-State Lighting Apparatus and Methods Using Parallel-Connected Segment Bypass Circuits" which is incorporated herein by reference in its entirety; U.S. patent application Ser. No. 13/235,103 filed Sep. 16, 2011 titled "Solid-State Lighting Apparatus and Methods Using Energy Storage" which is incorporated herein by reference in its entirety; U.S. patent application Ser. No. 13/360,145 filed Jan. 27, 2012 titled "Solid State Lighting Apparatus and Methods of Forming" which is incorporated herein by reference in its entirety; U.S. patent application Ser. No. 13/338,095 filed Dec. 27, 2011 titled "Solid-State Lighting Apparatus Including an Energy Storage Module for Applying Power to a Light Source Element During Low Power Intervals and Methods of Operating the Same" which is incorporated herein by reference in its entirety; U.S. patent application Ser. No. 13/338,076 filed Dec. 27, 2011 titled "Solid-State Lighting Apparatus Including Current Diversion Controlled by Lighting Device Bias States and Current Limiting Using a Passive Electrical Component" which is incorporated herein by reference in its entirety; and U.S. patent application Ser. No. 13/405,891 filed Feb. 27, 2012 titled "Solid-State Lighting Apparatus and Methods Using Energy Storage" which is incorporated herein by reference in its entirety.

The AC to DC conversion may be provided by a boost topology to minimize losses and therefore maximize conversion efficiency. The boost supply is connected to high voltage LEDs operating at greater than 200V. Other embodiments are possible using different driver configurations, or a boost supply at lower voltages.

LED lighting systems according to embodiments of the present invention can work with a variety of different types of power supplies or drivers. For example, a transformer with a bridge rectifier, a buck converter, boost converter, buck-boost converter, or single ended primary inductor converter (SEPIC) circuit could all be used as a driver for an LED lighting system or solid-state lamp like that described herein. A SEPIC provides for universal input, wide output voltage range (30 to 150 V in some cases), good efficiency, non-isolation, and can be designed as a single stage for low-cost. One embodiment of a suitable driver is described U.S. Provisional Application No. 61/984,467, as filed on Apr. 25, 2014, which is incorporated herein by reference in its entirety.

The lamp electronics 110 may be mounted on an electronics board 80 such as a printed circuit board (PCB), printed wiring board (PWB), metal core printed circuit board (MCPCB), FR-4 board, or other substrate on which the lamp electronics may be mounted and which may include the electrical conductors for delivering current to the lamp electronics 110 (collectively referred to as "electronics board"). The electrical conductors may be formed as traces on the electronics board, a separate metal layer or other electrical conductor formed as part of the board or applied to the board for delivering current from the base to the lamp electronics. The electronics board 80 typically supports the electrical components of the lamp 110 including the power supply, driver and/or other lamp electronics and may be supported in the internal cavity 174 of the heat sink 149.

Figure 27:
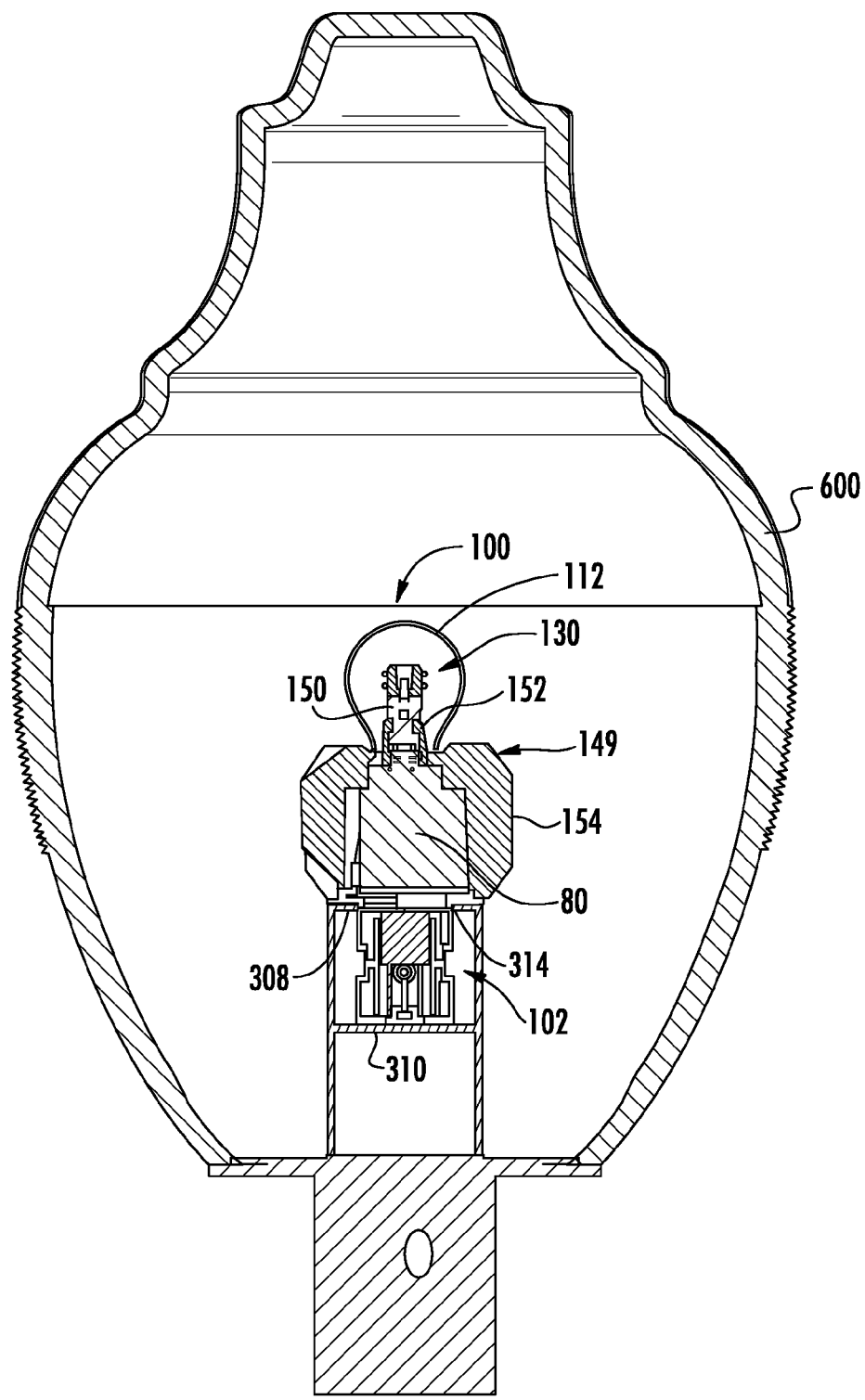
FIG. 27 is a section view taken along line 27-27 of FIG. 26.
Figure 28:
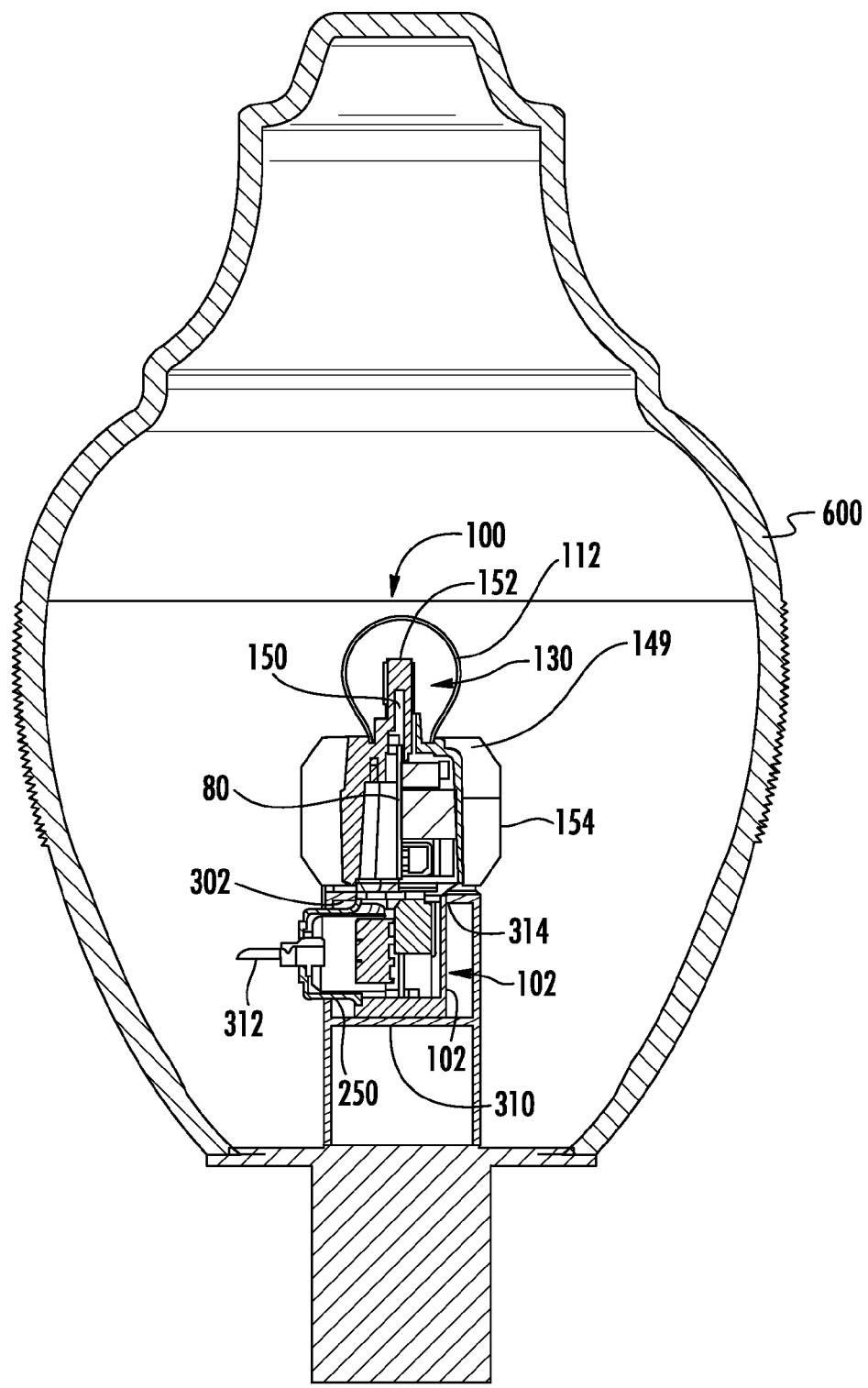
FIG. 28 is a section view of the lamp of FIG. 26 orthogonal to the view of FIG. 27.
Figure 29:
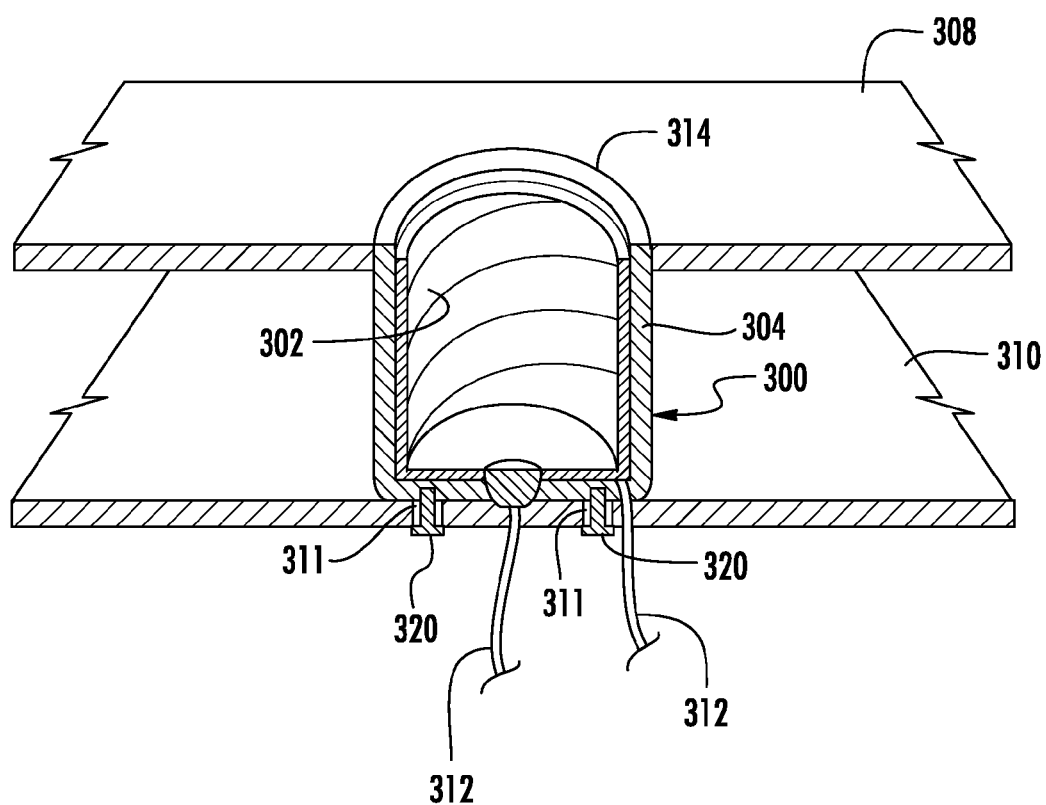
FIG. 29 is a partial section view of a traditional receptacle and a typical fixture mounting arrangement.

In one embodiment the base 102 is configured to fit into an existing light fixture such as an acorn light. Referring to FIGS. 27, 28 and 28 in one embodiment of a traditional light fixture the bulb is screwed into an electrically conductive receptacle such as a mogul receptacle 300, although a medium receptacle or other type of receptacle may also be used. A mogul receptacle 300 has a generally cylindrical shape with an electrically conductive screw receptacle 302 located inside of a tubular insulator 304. A typical mogul socket may be approximately 3 inches high and 2.25 inches in diameter. The mogul receptacle 300 is mounted inside of a light fixture, such as an Acorn light, such that the Edison screw connector of a traditional bulb may be screwed into the mogul receptacle. In some embodiments the mogul receptacle 300 is located between a pair of spaced plates 308, 310. The mogul receptacle 300 may be screwed to and supported on one of the plates 310 by screws 320 that are inserted through apertures 311 on the plate 310 and engage standard threaded holes on the receptacle 300. The second plate 308 may be positioned flush with, or over the top of, the screw receptacle 302 of the mogul receptacle 300 to isolate the receptacle 300 and lamp electronics such as the electrical supply wires 312, that provide current to the receptacle, from the user when the bulb is being changed. The second plate 308 may be provided with an aperture 314 disposed over and aligned with the mogul receptacle 300 to allow the Edison screw of the bulb to be inserted through the aperture 314 and into the screw receptacle 302.

The base 102 of the lamp is designed to fit into existing lights and to occupy the space occupied by the screw receptacle 300 in a traditional light. To install the lamp of the invention in an existing light fixture, the receptacle, such as the mogul receptacle 300, is removed from the light fixture by removing screws 320. The wires 312 that deliver critical current to the lamp are disconnected from the mogul receptacle 300 and are used with the lamp of the invention to deliver current to the lamp of the invention as will be described. The base 102 of the lamp is inserted into the space vacated by the traditional mogul receptacle 300. The base 102 of the lamp is physically mounted in the light fixture and, in some embodiments, the base 102 includes a universal mounting plate that allows it to be mounted to the existing mounting structure of the light. The electrical supply wires 312 from the light fixture are connected to the base 102 of the lamp of the invention to deliver current to the LEDs in the lamp. Configuring the lamp base 102 to fit into the existing light fixture allows existing light fixtures to be converted to solid state lights by simply removing the existing mogul receptacle, mounting the lamp base into the space vacated by the existing electrical receptacle, and reconnecting the existing electrical supply wires to the lamp of the invention.

In one embodiment, the base 102 comprises a support structure 200 that comprises a generally cylindrical housing that may be defined by a top plate 202 that is attached to the heat sink 149 and that closes the interior space 174 of the heat sink. The top plate 202 may be attached to the heat sink 149 by screws, adhesive or other connectors. The support structure 200 further comprises a circular bottom mounting plate 204 that is connected to the top plate 202 by a partial cylindrical or tubular wall 206. The cylindrical wall 206 and bottom mounting plate 204 are configured and dimensioned to have substantially the same, or smaller, external shape and dimensions as the receptacle 300, such as a mogul connector, that is to be replaced. In one embodiment the mounting plate 204 and wall 206 have external dimensions of approximately 3 inches height (H) and 2.25 inches in width (W) or less. Because the base is generally cylindrical the width of the base may be defined in terms of a diameter; however, the base may have other shapes than cylindrical such that the width defines a maximum dimension. The bottom mounting plate 204 includes a universal mounting structure that may be used to connect the lamp 100 to the existing mounting structure of the light. In a typical traditional acorn light the receptacle 300 is screwed to the mounting plate of the light where the receptacle is provided with threaded apertures for receiving screws 320 where the threaded apertures align with holes 311 formed in the mounting plate 310 of the light. In the lamp of the invention, the mounting plate 204 is provided with apertures that align with the existing apertures 311 of the light fixture. Because the lamp of the invention may be used in lights that use mogul bases, medium bases (A19 bases) or other bases more than one set of apertures may be provided on the universal mounting structure such that the lamp may be mounted in a variety of existing lights. In the illustrated embodiment two sets of apertures are provided, one set 220 is located on mounting plate 204 to be used in a light that formerly mounted a mogul base and one set 222 is located on the mounting plate 204 to be used in a light that formerly mounted a medium base. A greater or fewer sets of apertures may be provided and the sets may include more than two apertures. Moreover, where existing light fixtures use other mechanisms than the threaded holes typically found on a receptacle as the mounting structure for mounting the receptacle 300, the bottom mounting plate 204 may be provided with a mating mounting structure.

Wires or other connectors 230 extend from the lamp electronics 110 into the base 102 for delivering current to the LED assembly 130. The wires 230 may be soldered to electronics board 80 and may extend from the interior of the heat sink 149 into the interior of the base 102. In one embodiment, the electrical path to the lamp electronics 110 includes a surge protector 232 for protecting the lamp electronics 110 in the event of a power surge such as a lightning strike. An electrical connector 234 may be used to facilitate connection of the wires in the lamp and to facilitate removal of the surge protector in the event of a power surge. The electrical connector may comprise a terminal block (as shown in the figures), terminal board, terminal strip or other similar electrical connector that allows the electrical conductors such as wires 230 and 312 to be connected to the electrical path quickly and easily without splicing the wires. The wires 230 or other conductors from the lamp electronics 110 may connect to the electrical connector 234. A second set of wires may connect the surge protector 232 to the electrical connector 234. Finally, the existing electrical supply wires 312 from the light fixture may be connected to the electrical connector 234. To replace the surge protector 232 the electrical connector 234 may be pulled from the base 102, the surge protector 232 disconnected and removed from the base 102, and a new surge protector wired to the electrical connector 234. The surge protector 232 and terminal block 234 may then be remounted in the base. Snap-in receptacles 238 may be used for mounting the surge protector 232 and the terminal block 234 to facilitate the removal and reinstallation.

To provide a complete luminaire that may be used in an existing light, applicable safety standards may require that the lamp electronics be isolated to provide approved flame, impact and enclosure ratings. The base 102 may be enclosed using a cover 250 that is releasably secured to the base 102 to isolate the exposed electrical components. The cover 250 may include a tab 252 that engages a slot 254 or other receptacle on the base to secure one side of the cover and a screw or other fastener 256 may be used to secure the opposite side of the cover 250. A wide variety of mechanisms may be used to secure the cover 250 to the base 102. In some circumstances applicable standards may require that a minimum volume of space be provided inside of the enclosure based on the number of electrical connections made inside of the enclosure. Accordingly, the cover 250 may be sized and shaped to provide the internal volume as required by applicable standards such that a portion of the cover 250 may extend beyond the envelope of the existing connector 300. The cover 250 may be provided with an aperture or knockout 260 that allows the wiring 312 to be extended into the enclosure and connected to the terminal block 234. The electrical supply wiring 312 may be contained in a suitable conduit such as a flexible conduit 315 where the conduit may be connected to the aperture 260 to provide an enclosed electrical path to the lamp.

To mount the lamp in a light fixture, the existing screw receptacle connector 300 (e.g. mogul connector) is removed as previously described. Because the base 102 is provided with the same general shape and configuration as the removed receptacle 300 the base 102 may be inserted into the existing space vacated by the screw receptacle such as through aperture 314. The universal connector of the bottom mounting plate 204 of the base 102 is secured to the light fixture such as by screwing the mounting plate 204 to the existing mounting structure of the lamp such as by using screws 320. The electrical supply wiring 312 is extended through the aperture 260 in the cover 250 and is connected to the terminal block 234 to complete the electrical path to the LEDs 127. The flexible conduit 315 may be connected to the knockout 260. The cover 250 may be secured to the base 102. Because the base 102 is dimensioned and configured to fit into the same space as the receptacle it is replacing the light fixture does not have to be reconfigured or modified to accept the lamp 100. After the base is installed, the cover 250 may be secured to the base 102 to complete the assembly; however, because the cover is removable it does not interfere with the mounting of the lamp in the existing fixture.

While in some embodiments the existing receptacle 300 may be removed from the light fixture, in other embodiments the lamp base 102 may be provided with a mating screw connector 103 such that the lamp may be screwed into the existing receptacle as shown for example in FIGS. 16-18, 23 and 24. In some cases using the screw connector 103 that mates with an existing receptacle 300 may require additional testing of the lamp as a retrofit application, replacing the existing receptacle 300 as previously described may not require this additional testing. The lamp electronics may be mounted on a board 80 that is mounted in the cavity 174 of the heat sink 149 as previously described. A cover 202 may be mounted to the heat sink 149 to cover the interior of the heat sink and to isolate the lamp electronics from the external environment. An adapter 103, such as a mogul adapter, medium adapter or other electrical connector, is mounted to the cover 202 and is electrically coupled to the lamp electronics on the board 80 to complete the electrical path to the LEDs. The electrical path between the adapter 103 and the lamp electronics may be made by a soldered connection using wires, by a snap-fit electrical interconnect or by other electrical connector mechanism.

In some embodiments a shield 700 may be used to reflect some of the light emitted from the lamp and to shield a portion of the emitted light from being projected directly from the lamp in a particular direction. For example, the shield 700 may be disposed adjacent the side of the lamp that faces a home or other structure to prevent light from being projected from the lamp directly into the home or other structure. The shield 700 may be used to alter the light pattern of the lamp. The shield 700 may be made of a thermally conductive material such as metal and may be secured to the heat dissipating portion 154 of heat sink 149 to dissipate heat from the lamp. The shield may include a mounting structure 702 such as deformable clips that engage the fins 158 of the heat sink. Other mechanisms for mounting the shield 700 to the heat sin 149 may also be used. The shield 700 may have a surface that is configured to reflect the light in a desired pattern. For example the shield may comprise a plurality of members 704, 706, 708 that are disposed at an angle relative to one another. A greater or fewer number of members may be used and the members may be arranged in a variety of configurations to create a desired light pattern. The shield may also comprise a curved surface or surfaces.

The lamp may be used in damp or dry listed locations. The lamp may produce between approximately 2500 and 4500 Lumens, and in some embodiments may produce between approximately 3000 and 4000 Lumens, and in some embodiments the lamp may produce approximately 3500 Lumens. In some embodiments the LED assembly 130 may comprise approximately 40 XTE LEDs manufactured and sold by CREE INC. The lamp may have a color rendering index of greater than 70 and in some embodiments the CRI may be greater than 80 and in some embodiments the CRI may be about 83. The lamp may produce approximately 100 Lumens per Watt and in some embodiments may produce over 100 Lumens per Watt. The color temperature may be approximately 2800-3300 K and in one embodiment the color temperature may be approximately 3200 K and in other embodiments the color temperature may be approximately 2800-2900 K. It will be appreciated that the refractor lens or globe 600 may affect the Lumen output of the lamp. For example, the globe 600 may reduce the output of the lamp approximately 8-10 percent compared to a lamp operated without the globe. The size and shape of the heat sink 149 is selected to adequately cool the LEDs 127 such that the performance of the LEDs is not degraded over time and to fit into the light fixture with which the lamp is to be used.

Figure 9:
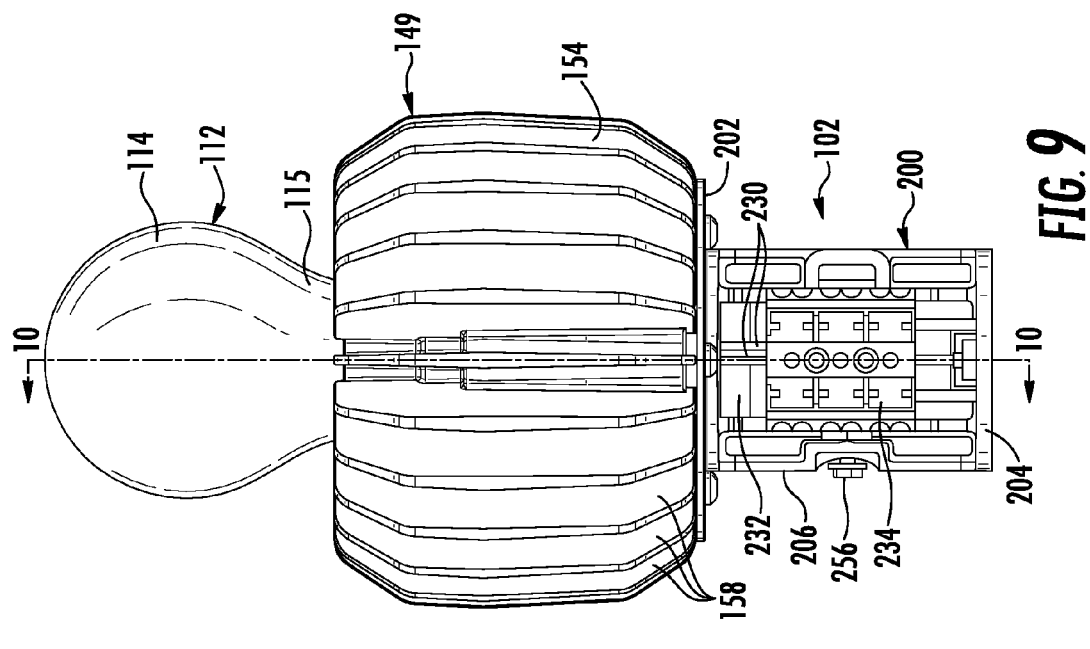
FIG. 9 is a front view of the lamp of FIG. 1 with the cover removed.
Figure 8:
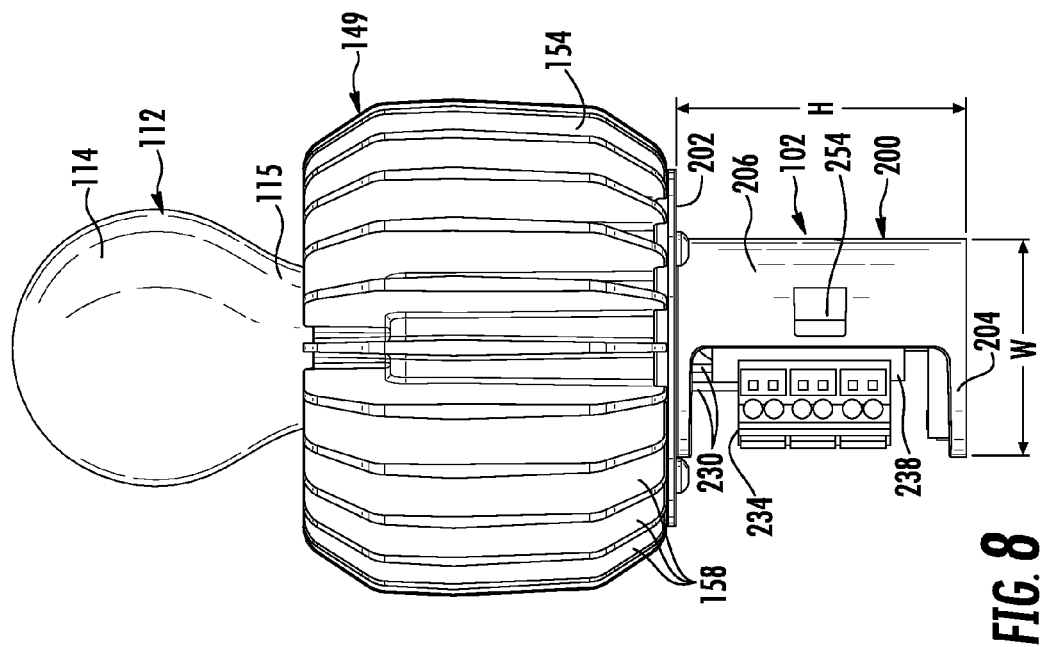
FIG. 8 is a side view of the lamp of FIG. 1 with the cover removed.

As explained above the lamp of the invention is an omnidirectional lamp for use in outdoor applications such as in an upright pole mounted light. The lamp has a high Lumen output where significant heat is generated by the LEDs. Because of the amount of heat generated by the LEDs it is important that the heat be dissipated from the lamp to avoid degradation of the performance of the LEDs over time. To control the thermals of the lamp a relatively large heat sink is used. The external portion 152 of heat sink 149 in some embodiments has a width that is greater than the width of the enclosure 112. The width being the direction perpendicular to the longitudinal axis (the longitudinal axis being represented, for example, by line 10-10 of FIG. 9). In some embodiments the enclosure 112 and exposed portion 152 of the heat sink 149 are round such that the width may be defined as the diameters of these elements where the diameter of the external heat dissipating portion 152 of the heat sink 149 is larger than the diameter of the enclosure 112. It will be appreciated that one of the external heat dissipating portion 152 of the heat sink 149 and the enclosure 112 may be round while the other one of the external heat dissipating portion 152 of the heat sink 149 and the enclosure 112 may be non-round such that the dimension of one of these components may be considered a diameter and the dimension of the other one of these components may be considered a width. As used herein the term "width" is used to indicated the largest dimension of the enclosure and/or the external heat dissipating portion 152 of the heat sink 149 whether these components are round or non-round for the dimension generally perpendicular to the longitudinal axis of the lamp. In a typical indoor LED bulb the heat sink is typically made to have a width that is narrower than the width of the enclosure such that the heat sink does not block downlight emitted from the enclosure. This is important in indoor lights both for the appearance of the light and to comply with standards such as Energy Star requirements that require a certain amount of downlight. In the outdoor lamp described herein the width of the external heat dissipating portion 152 of the heat sink 149 may be made greater than the width of the enclosure 112 to control the thermals of the LEDs without adversely affecting the performance of the lamp for a number of reasons. For example, the lamp produces such a high Lumen output that sufficient downlight is produced for outdoor applications even with the large heat sink. Moreover, because the lamp is intended for use as an outdoor light the same requirements do not apply. Also, as explained with respect to FIG. 25, for example, the lamp 100 is intended to be used in an acorn light, or other similar light, where an additional optic in the form of a globe 600 is used. These globes typically include diffusive properties such that light emitted by the lamp 100 is diffused and reflected inside of globe 600 such that the a portion of the omnidirectional light produced by lamp 100 is emitted from the globe as downlight. The reflective and diffusive properties of globe 600 combined with the high Lumen output of lamp 100 generates sufficient downlight even with the relatively larger heat sink. While the size of the external heat dissipating portion 152 of the heat sink 149 has been described in terms of a width dimension, the heat sink may also have a height (in the direction along the longitudinal axis of the lamp) that is greater than the height of the enclosure. In some embodiments one or both of the width and height of the external heat dissipating portion 152 of the heat sink 149 may be greater than the corresponding dimension of the enclosure 112. Moreover, the volume of the external heat dissipating portion 152 of the heat sink 149 is greater than the volume define by the enclosure 112. The base 102, as previously described, has a relatively narrow width and is mounted to a first side of the external heat dissipating portion 152. The enclosure 112 is mounted to a second side of the external heat dissipating portion 152 opposite to the base 102. The width of the external heat dissipating portion 152 is greater than the width of the enclosure 112 and the width of the base 102.

Although specific embodiments have been shown and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:
1. A lamp for use in an existing light fixture having an electrical receptacle comprising:
an at least partially optically transmissive enclosure;
a LED assembly comprising at least one LED, the LED assembly being located in the enclosure and the at least one LED operable to emit light when energized through an electrical path;
a base having an external size that is approximately the same size or smaller than an external size of the electrical receptacle, the base comprising a universal mounting mechanism for mounting the lamp to the light fixture and an electrical connector in the electrical path for electrically connecting the light fixture to the lamp;
a heat sink structure comprising a heat dissipating portion for dissipating heat from the LED assembly, the heat dissipating portion being disposed between the optically transmissive enclosure and the base, and a cavity in the heat dissipating portion that is closed by the base and at least partially contains lamp electronics, the lamp electronics being in the electrical path.

2. The lamp of claim 1 wherein the base comprises a support structure comprising a mounting plate and a wall, the mounting plate and the wall being configured and dimensioned to have an external size that is approximately the same size or smaller than the external size of the electrical receptacle.

3. The lamp of claim 2 wherein the mounting plate includes the universal mounting mechanism connecting the lamp to an existing mounting structure of the fixture.

4. The lamp of claim 3 wherein the universal mounting mechanism comprises at least two sets of apertures.

5. The lamp of claim 1 further comprising a surge protector in the electrical path.

6. The lamp of claim 1 further comprising an electrical connector in the electrical path for receiving electrical supply wires from the fixture.

7. The lamp of claim 1 further comprising a cover that is releasably secured to the base.

8. The lamp of claim 1 further comprising a shield positioned to reflect some of the light emitted from the lamp.

9. The lamp of claim 8 wherein the shield is made of a thermally conductive material and is secured to the heat sink.

10. The lamp of claim 1 wherein the lamp produces between approximately 2500 and 4500 Lumens.

11. The lamp of claim 1 wherein the light has a color rendering index of greater than 70.

12. The lamp of claim 1 wherein the lamp produces approximately 100 Lumens per Watt.

13. The lamp of claim 1 wherein the light has a color temperature of approximately 2800-3300 K.

14. The lamp of claim 1 wherein the universal mounting mechanism is not in the electrical path.

15. The lamp of claim 1 further comprising a tower extending into the enclosure for supporting the LED assembly such that the at least one LED is positioned in a center of the enclosure.

16. The lamp of claim 15 further comprising a heat sink for dissipating heat from the at least one LED, the heat sink comprising the tower that extends along a longitudinal axis of the lamp.

17. A lamp comprising:
an at least partially optically transmissive enclosure;
a base comprising a universal mounting mechanism for mounting the lamp to a light fixture;
a LED assembly comprising at least one LED, the LED assembly being located in the enclosure and the at least one LED operable to emit light when energized through an electrical path;
a surge protector and an electrical connector positioned at least partially in the base and being in the electrical path;
a heat sink comprising a first portion in the enclosure for supporting the LED assembly and a second portion external of the enclosure for dissipating heat, the base being connected to the heat sink, the second portion of the heat sink being disposed between and connected to the optically transmissive enclosure and the base, the second portion comprising a cavity that at least partially contains lamp electronics, the lamp electronics comprising a driver and being in the electrical path.

18. A lamp comprising:
an omnidirectional enclosure having a first dimension;
a LED assembly comprising at least one LED, the LED assembly being located in the enclosure and the at least one LED operable to emit light when energized through an electrical path;
a base, the base comprising a universal mounting mechanism for mounting the lamp to a light fixture and an electrical connector in the electrical path for electrically connecting the light fixture to the lamp;
a heat sink thermally coupled to the LED assembly for dissipating heat from the at least one LED, the heat sink comprising an external heat dissipating portion disposed between the enclosure and the base, the external heat dissipating portion having a second dimension where the second dimension corresponds to the first dimension and the second dimension is greater than the first dimension.

19. The lamp of claim 18 where the first dimension is a width of the enclosure and the second dimension is a width of the external heat dissipating portion.

20. The lamp of claim 18 where the first dimension is a height of the enclosure and the second dimension is a height of the external heat dissipating portion.

21. The lamp of claim 18 where the first dimension is a volume of the enclosure and the second dimension is a volume of the external heat dissipating portion.

22. The lamp of claim 18 wherein the lamp is mounted inside of a diffusive globe.

23. The lamp of claim 18 wherein the lamp produces between approximately 2500 and 4500 Lumens.

24. The lamp of claim 18 wherein the lamp produces between approximately 3000 and 4000 Lumens.

25. The lamp of claim 18 wherein the lamp produces approximately 3500 Lumens.

26. The lamp of claim 18 further comprising a tower extending into the enclosure for supporting the LED assembly such that the at least one LED is positioned in a center of the enclosure.

27. The lamp of claim 26 wherein the tower forms part of the heat sink, the tower extending along a longitudinal axis of the lamp.

28. An outdoor lamp comprising:
an omnidirectional enclosure;
a base comprising a universal mounting mechanism for mounting the lamp to a light fixture and an electrical connector in an electrical path for electrically connecting the light fixture to the lam where the universal mounting mechanism is not in the electrical path; and
a heat sink thermally coupled to the LED assembly for dissipating heat from the at least one LED the heat sink comprising an external heat dissipating portion where the enclosure is mounted to a first side of the external heat dissipating portion and the base is mounted to an opposite second side of the external heat dissipating portion, the electrical path extending through the heat dissipating portion;
a LED assembly comprising at least one LED, the LED assembly being located in the enclosure and the at least one LED operable to emit light when energized through the electrical path where the at least one LED produces between approximately 2500 and 4500 Lumens.

29. The outdoor lamp of claim 28 wherein the enclosure has a first width, the base has a second width and the external heat dissipating portion has a third width, the third width being greater than the first width and the second width.

30. The lamp of claim 28 further comprising a tower extending into the enclosure for supporting the LED assembly such that the at least one LED is positioned in a center of the enclosure.

31. The lamp of claim 30 further comprising a heat sink for dissipating heat from the at least one LED, the heat sink comprising the tower that extends along a longitudinal axis of the lamp.

32. A method of installing a lamp comprising:
disconnecting electrical supply wires from an electrical receptacle;
removing the electrical receptacle from a space in the light fixture, the space being defined by plate comprising an aperture;
inserting a lamp into the fixture, the lamp comprising:
an at least partially optically transmissive enclosure;
a base having an external size that is the same size or smaller than an external size of the electrical receptacle connecter;
a heat sink disposed between the enclosure and the base;
a LED assembly comprising at least one LED, the LED assembly being located in the enclosure and the at least one LED operable to emit light when energized through an electrical path;
the base comprising a universal mounting mechanism for mounting to the light fixture;
inserting the base through the aperture and positioning the base of the lamp in the space vacated by the electrical receptacle such that the base is positioned to a first side of the plate and the heat sink and enclosure are positioned to an opposite side of the plate;
mounting the universal mounting mechanism to the fixture;
connecting the electrical supply wires to the electrical path.

33. The method of claim 32 wherein the step of removing the electrical receptacle comprises removing screws from apertures in the fixture and the universal mounting mechanism includes a first pair of apertures and a second pair of apertures wherein the step of positioning the base of the lamp in the space includes aligning the apertures with one of the first pair of apertures and the second pair of apertures.

34. The method of claim 32 wherein the step of connecting the electrical supply wires to the path comprises connecting the electrical supply wires to a terminal block in the base.

* * * * *

UNITED STATES PATENT AND TRADEMARK OFFICE
CERTIFICATE OF CORRECTION

PATENT NO. : 9,618,162 B2
APPLICATION NO. : 14/284781
DATED : April 11, 2017
INVENTOR(S) : Bendtsen et al.

Page 1 of 1

It is certified that error appears in the above-identified patent and that said Letters Patent is hereby corrected as shown below:

In the Claims

In Column 20, Claim 28, please change Line 48 to:
ing the light fixture to the lamp, where the universal In Column 21, Claim 32, please change Line 19 to:
tacle;

Signed and Sealed this
Tenth Day of April, 2018

Andrei Iancu
*Director of the United States Patent and Trademark Office*